United States Patent
Hooli et al.

(10) Patent No.: US 12,232,118 B2
(45) Date of Patent: Feb. 18, 2025

(54) RESOURCE DETERMINATION FOR COMMUNICATING UPLINK CONTROL SIGNAL IN WIDE BANDWIDTH DEPLOYMENTS

(71) Applicant: Nokia Technologies Oy, Espoo (FI)

(72) Inventors: Kari Hooli, Oulu (FI); Esa Tiirola, Kempele (FI); Timo Lunttila, Espoo (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 645 days.

(21) Appl. No.: 17/266,743

(22) PCT Filed: Jan. 2, 2020

(86) PCT No.: PCT/FI2020/050003
§ 371 (c)(1),
(2) Date: Feb. 8, 2021

(87) PCT Pub. No.: WO2020/144402
PCT Pub. Date: Jul. 16, 2020

(65) Prior Publication Data
US 2021/0321392 A1      Oct. 14, 2021

Related U.S. Application Data

(60) Provisional application No. 62/790,676, filed on Jan. 10, 2019.

(51) Int. Cl.
*H04W 72/04* (2023.01)
*H04L 5/00* (2006.01)
(Continued)

(52) U.S. Cl.
CPC .......... *H04W 72/21* (2023.01); *H04L 5/0078* (2013.01); *H04W 72/0453* (2013.01); *H04W 74/0808* (2013.01)

(58) Field of Classification Search
CPC ..... H04L 5/001; H04L 5/0032; H04L 5/0053; H04L 5/0078; H04L 5/0094;
(Continued)

(56) References Cited

U.S. PATENT DOCUMENTS

2017/0289869 A1    10/2017  Nogami et al.
2018/0027589 A1     1/2018  Yang
(Continued)

FOREIGN PATENT DOCUMENTS

CN    105898770 A    8/2016
CN    108574987 A    9/2018
(Continued)

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.
(Continued)

*Primary Examiner* — Mansour Oveissi
(74) *Attorney, Agent, or Firm* — ALSTON & BIRD LLP

(57) ABSTRACT

Solutions for determining a resource for transmitting/detecting an uplink (UL) control signal are proposed. For example, a method includes receiving a physical resource configuration and/or an assigned resource indicator for transmitting the UL control signal, wherein the physical resource configuration indicates a plurality of resources in frequency domain. The method also includes determining a resource based on the received physical resource configuration and/or the assigned resource indicator; and adjusting the determined resource for transmitting the UL control signal based on at least one of an outcome of downlink (DL) listen before talk (LBT) performed prior to the transmission of the UL control signal, an outcome of UL LBT performed prior to the transmission of the UL control signal, and a time gap
(Continued)

between the UL LBT and the transmission of the UL control signal.

16 Claims, 12 Drawing Sheets

(51) Int. Cl.
*H04W 72/0453* (2023.01)
*H04W 72/21* (2023.01)
*H04W 74/0808* (2024.01)

(58) Field of Classification Search
CPC . H04W 72/0453; H04W 72/21; H04W 72/23; H04W 74/0808
See application file for complete search history.

(56) References Cited

U.S. PATENT DOCUMENTS

| | | | |
|---|---|---|---|
| 2018/0124749 A1 | 5/2018 | Park et al. | |
| 2018/0359072 A1 | 12/2018 | Tiirola et al. | |
| 2019/0132834 A1* | 5/2019 | Yan | H04L 5/0032 |
| 2019/0349815 A1 | 11/2019 | Tiirola et al. | |
| 2020/0008229 A1 | 1/2020 | Li et al. | |
| 2020/0045733 A1 | 2/2020 | Tiirola et al. | |
| 2020/0329447 A1* | 10/2020 | Siomina | H04W 56/0005 |
| 2021/0328728 A1* | 10/2021 | El Hamss | H04L 1/1864 |

FOREIGN PATENT DOCUMENTS

| | | | | |
|---|---|---|---|---|
| WO | WO 2020/068251 A1 * | 7/2019 | | H04W 72/04 |
| WO | 2019/219155 A1 | 11/2019 | | |

OTHER PUBLICATIONS

"Potential Solutions and Techniques for NR Unlicensed", 3GPP TSG RAN Meeting #80, R1-1802526, Agenda: 7.6.4, Nokia, Feb. 26-Mar. 2, 2018, 10 pages.

"CR on Updating Requirement for BWP Switching Delay in TS38. 133 (Section 8.6)", 3GPP TSG-RAN WG4 Meeting #88b, R4-1814069, Mediatek Inc., Oct. 8-12, 2018, 2 pages.

"Feature Lead Summary of HARQ Enhancement in NR-U", 3GPP TSG RAN WG1 Meeting #95, R1-1814146, Agenda Item: 7.2.2.4.3, Huawei, Nov. 12-16, 2018, 15 pages.

Lagen et al., "New Radio Beam-Based Access to Unlicensed Spectrum: Design Challenges and Solutions", arXiv, Sep. 27, 2018, 18 pages.

"3rd Generation Partnership Project; Technical Specification Group Radio Access Network; Study on NR-based access to unlicensed spectrum (Release 16)", 3GPP TR 38.889 V16.0.0, Dec. 2018, pp. 1-119.

"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 285 pages.

International Search Report and Written Opinion received for corresponding Patent Cooperation Treaty Application No. PCT/FI2020/050003, dated Mar. 20, 2020, 18 pages.

"Physical Layer Design of UL Signals and Channels for NR Unlicensed Operation", 3GPP TSG RAN WG1 Meeting #95 , R1-1812559, Agenda: 7.2.2.3.2, LG Electronics, Nov. 12-16, 2018, 11 pages.

"UL PHY Channels for NR Unlicensed", 3GPP TSG RAN WG1 Meeting #95, R1-1812193, Agenda: 7.2.2.3.2, Huawei, Nov. 12-16, 2018, 22 pages.

Extended European Search Report received for corresponding European Patent Application No. 20738415.7, dated Mar. 11, 2022, 10 pages.

"HARQ enhancements in NR unlicensed", 3GPP TSG RAN WG1 Meeting #94, R1-1808063, Agenda: 7.2.2.4.3, Huawei, Aug. 20-24, 2018, 8 pages.

Ericsson, "Corrections to Handling of SL Unknown Protocol Data", 3GPP TSG- RAN WG2 #103, Change Request CR 1343, R1-1812358, (Aug. 20-24, 2018), 2 pages.

Huawei et al., "HARQ Enhancements in NR Unlicensed", 3GPP TSG RAN WG1 Meeting #95, R1-1812196, (Nov. 12-16, 2018), 13 pages.

Office Action for Chinese Application No. 202080005426.X dated Oct. 28, 2023, 15 pages.

Office Action for Indonesian Application No. P00202104595 dated Feb. 7, 2024, 6 pages.

Qualcomm Incorporated, "Views on NR for Bands in 6-24GHz Range", 3GPP TSG RAN Meeting 82, RP-182398, (Dec. 10-13, 2018), 121 pages.

Office Action for European Application No. 20738415.7 dated Apr. 25, 2024, 6 pages.

Office Action for Chinese Application No. 202080005426.X dated Apr. 19, 2024, 11 pages.

Office Action for Indonesian Application No. P00202104595 dated Oct. 25, 2024, 6 pages.

* cited by examiner

RESOURCE DETERMINATION FOR COMMUNICATING UPLINK CONTROL SIGNAL IN WIDE BANDWIDTH DEPLOYMENTS

RELATED APPLICATION

This application was originally filed as PCT Application No. PCT/FI2020/050003 on Jan. 2, 2020, which claims priority from U.S. application 62/790,676, filed Jan. 10, 2019, each of which is incorporated herein by reference in its entirety.

CROSS REFERENCE TO RELATED APPLICATION

This application claims the benefit of U.S. Provisional Application No. 62/790,676 entitled "PUCCH RESOURCE DETERMINATION IN WIDE BANDWIDTH DEPLOYMENTS" filed on Jan. 10, 2019, which is incorporated herein by reference in its entirety.

TECHNICAL FIELD

This disclosure concerns determination of a resource for Uplink (UL) control signal transmission/reception in a system with bandwidth part (BWP) configuration, for example in a new radio (NR) unlicensed (NR-U) band scenario.

BACKGROUND

There are several wide unlicensed bands, and even a single gNB or a UE can occasionally access very wide bandwidths. Hence, wideband operation is one of the key building blocks for NR unlicensed. Both carrier aggregation and bandwidth part (BWP) mechanisms are supported in Rel-15 NR for wideband operations, and it is desirable to support both mechanisms as well in NR-U.

Conventional carrier aggregation offers several benefits, for example,

Frequency domain flexibility: aggregated carriers do not need to be adjacent but may be widely separated. This offers diversity for channel access among other benefits.

Each carrier may employ its own listen-before-talk (LBT), which provides agile channel access.

Of course, carrier aggregation also has a price: multiple RF chains are required, and the price of UE transceivers may be increased. Additionally, carrier aggregation increases UE power consumption and has rather considerable latency in the component carrier activation/deactivation to save UE power.

Several issues relevant to NR-U band scenarios will be discussed below at the beginning of the Detailed Description.

It should be understood, both above and in the discussion to follow, that the term "gNB" should be understood to mean "network node". The term "gNB" is used to denote a network node in 5G. However, it should be understood that the present disclosure, as described below, is not limited to 5G, but may be applicable to other generations yet to be developed. As a consequence, "gNB" should be understood more broadly as a network node.

SUMMARY

In a first aspect of the present disclosure, a method for determining a resource for transmitting an uplink (UL) control signal comprises: receiving a physical resource configuration and/or an assigned resource indicator for transmitting the UL control signal, the physical resource configuration indicating a plurality of resources in frequency domain; determining a resource based on the received physical resource configuration and/or the assigned resource indicator; and adjusting the determined resource for transmitting the UL control signal based on at least one of: an outcome of downlink (DL) LBT performed prior to the transmission of the UL control signal, an outcome of UL LBT performed prior to the transmission of the UL control signal, and a time gap between the UL LBT and the transmission of the UL control signal.

In a second aspect of the present disclosure, a method for detecting an uplink (UL) control signal from a terminal device comprises: transmitting a physical resource configuration and/or an assigned resource indicator for the UL control signal to the terminal device, the physical resource configuration indicating a plurality of resources in frequency domain; determining a plurality of candidate resources for detecting the UL control signal based on at least the transmitted physical resource configuration and/or the assigned resource indicator; and performing blind detection of the UL control signal on the determined plurality of candidate resources.

In a third aspect of the present disclosure, an apparatus for determining a resource for transmitting an uplink (UL) control signal comprises: at least one processor; and at least one memory including computer program code, the at least one memory and the computer program code being configured, with the at least one processor, to cause the apparatus to perform the following: receive a physical resource configuration and/or an assigned resource indicator for transmitting the UL control signal, the physical resource configuration indicating a plurality of resources in frequency domain; determine a resource based on the received physical resource configuration and/or the assigned resource indicator; and adjust the determined resource for transmitting the UL control signal based on at least one of: an outcome of DL LBT performed prior to the transmission of the UL control signal, an outcome of UL LBT performed prior to the transmission of the UL control signal, and a time gap between the UL LBT and the transmission of the UL control signal.

In a fourth aspect of the present disclosure, an apparatus for detecting an uplink (UL) control signal from a terminal device comprises: at least one processor; and at least one memory including computer program code, the at least one memory and the computer program code being configured, with the at least one processor, to cause the apparatus to perform the following: transmit a physical resource configuration and/or an assigned resource indicator for the UL control signal to the terminal device, the physical resource configuration indicating a plurality of resources in frequency domain; determine a plurality of candidate resources for detecting the UL control signal based on at least the transmitted physical resource configuration and/or the assigned resource indicator; and perform blind detection of the UL control signal on the determined plurality of candidate resources.

In a fifth aspect of the present disclosure, an apparatus for determining a resource for transmitting an uplink (UL) control signal comprises: means for receiving a physical resource configuration and/or an assigned resource indicator for transmitting the UL control signal, the physical resource configuration indicating a plurality of resources in frequency domain; means for determining a resource based on the received physical resource configuration and/or the assigned resource indicator; and means for adjusting the determined resource for transmitting the UL control signal based on at least one of: an outcome of DL LBT performed prior to the transmission of the UL control signal, an outcome of UL LBT performed prior to the transmission of the UL control signal, and a time gap between the UL LBT and the transmission of the UL control signal.

In a sixth aspect of the present disclosure, an apparatus for detecting an uplink (UL) control signal from a terminal device comprises: means for transmitting a physical resource configuration and/or an assigned resource indicator for the UL control signal to the terminal device, the physical resource configuration indicating a plurality of resources in frequency domain; means for determining a plurality of candidate resources for detecting the UL control signal based on at least the transmitted physical resource configuration and/or the assigned resource indicator; and means for performing blind detection of the UL control signal on the determined plurality of candidate resources.

In a seventh aspect of the present disclosure, a computer program product comprises a non-transitory computer-readable storage medium bearing computer program code embodied therein for use with a computer, the computer program code comprising code for performing: receiving a physical resource configuration and/or an assigned resource indicator for transmitting the UL control signal, the physical resource configuration indicating a plurality of resources in frequency domain; determining a resource based on the received physical resource configuration and/or the assigned resource indicator; and adjusting the determined resource for transmitting the UL control signal based on at least one of: an outcome of DL LBT performed prior to the transmission of the UL control signal, an outcome of UL LBT performed prior to the transmission of the UL control signal, and a time gap between the UL LBT and the transmission of the UL control signal.

In an eighth aspect of the present disclosure, a computer program product comprises a non-transitory computer-readable storage medium bearing computer program code embodied therein for use with a computer, the computer program code comprising code for performing: transmitting a physical resource configuration and/or an assigned resource indicator for the UL control signal to the terminal device, the physical resource configuration indicating a plurality of resources in frequency domain; determining a plurality of candidate resources for detecting the UL control signal based on at least the transmitted physical resource configuration and/or the assigned resource indicator; and performing blind detection of the UL control signal on the determined plurality of candidate resources.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
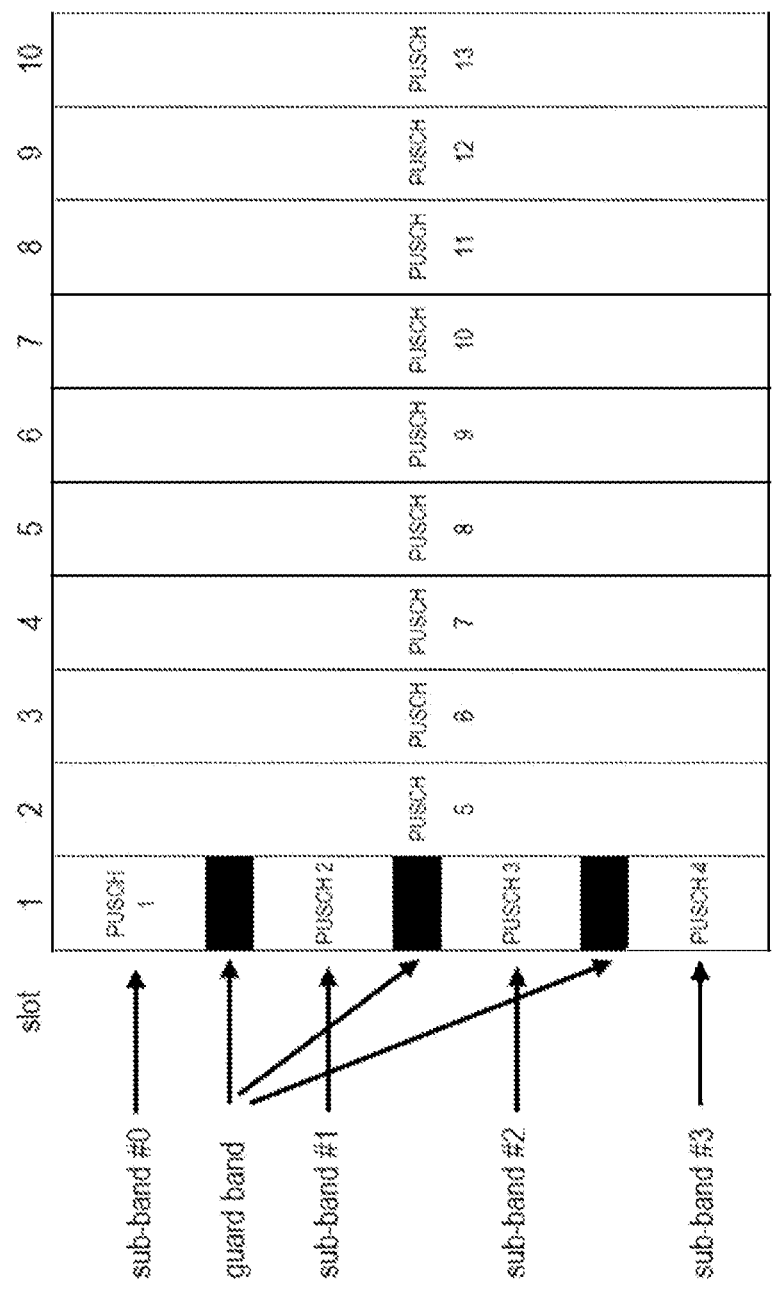
FIG. 1 is an illustration of PUSCHs per sub-band (in slot 1) as well as PUSCHs across sub-bands.

I. Expectations for Wideband Operation on NR-U

In Rel-15 NR, the concept of serving cell adaptive bandwidth (BW) was introduced by means of bandwidth parts (BWPs). Specifically, a UE is instructed to operate on a specific part of the bandwidth of a gNB, that is, on a BWP. Up to four BWPs can be configured separately for UL and DL. Each BWP can have configurations related to, for example, a separately configured subcarrier spacing (SCS), cyclic prefix, BW in terms of contiguous PRBs as well as in the location of the BW in the total BW of a cell, and K0, K1 and K2 values defining the time offsets from DL assignment reception to the beginning of PDSCH, from the end of PDSCH to HARQ-ACK transmission time, and from UL grant reception to the start of PUSCH transmission, respectively. In case of unpaired spectrum, that is, time division duplex (TDD), UL and DL BWPs can be paired, in which case the center frequency of both BWPs is required to be the same. One of the BWPs may be defined as a default BWP, for example, to facilitate UE battery saving.

In Rel-15 NR, a UE may have only one BWP active at a time. An active BWP can be indicated by a field in the downlink control signaling (DCI) or by RRC signaling. BWP switching occurs after a UE has received the signaling changing the active BWP. The switching time varies with the numerology, and the minimum BWP switching time is 750 μs for the faster Type 1 UEs, assuming 60 kHz sub-carrier spacing (SCS) (see 3GPP R4-1814069). A UE may also fall back to a default BWP after a configured period of inactivity.

The BWP mechanism provides an alternative wideband mechanism when accessing unlicensed spectrum on adjacent 20 MHz channels, as it can provide savings in the UE cost with reduced number of RF chains. Single RF chain and fast Fourier transform (FFT) processing can be used to access a wide bandwidth of, for example, 80 MHz or 160 MHz on 5 GHz or 6 GHz (potential) unlicensed bands. It also improves the trade-off between UE throughput and battery consumption via fast BWP switching. As the BWP switching time is shorter than the component carrier (de) activation time, a UE can be switched rather frequently to narrow BWP, and back to wideband BWP, saving UE battery and compromising throughput less than the slower component carrier (de)activation.

A channel contention mechanism is one of the key components for efficient wideband operation, and the NR-U study item (SI) of 3GPP concluded that NR unlicensed supports 20 MHz grid for LBT operation at least for the 5 GHz unlicensed band, as both Wi-Fi and LTE LAA LBT operate on 20 MHz channels, and some of the regulatory rules, for example, the ETSI standard, require LBT operation on 20 MHz grid at 5 GHz band. In some embodiments, we refer to the 20 MHz bands or multiples of the 20 MHz bands as sub-bands of a BWP. In other words, the channel availability is assessed separately for each sub-band for example by means of Clear Channel Assessment (CCA). It should be appreciated that embodiments are not limited to such specific sub-band size, and instead, wider or narrower sub-band may also be used.

Correspondingly, the following is captured in 3GPP TR 38.889 V16.0.0:

A) For wideband operation for both DL and UL,
Bandwidth larger than 20 MHz can be supported with multiple serving cells.
NR-U should support that a serving cell can be configured with bandwidth larger than 20 MHz.

B) For DL operation, the following options for BWP-based operation within a carrier with bandwidth larger than 20 MHz can be considered.

Option 1a: Multiple BWPs configured, multiple BWPs activated, transmission of PDSCH on one or more BWPs.
Option 1b: Multiple BWPs configured, multiple BWPs activated, transmission of PDSCH on single BWP.
Option 2: Multiple BWPs can be configured, single BWP activated, gNB transmits PDSCH on a single BWP if clear channel assessment (CCA) is successful at the gNB for the whole BWP.
Option 3: Multiple BWPs can be configured, single BWP activated, gNB transmits PDSCH on parts or whole of single BWP where CCA is successful at the gNB.

C) For UL operation, the following options for BWP-based operation within a carrier with bandwidth larger than 20 MHz can be considered.

Option 1a: Multiple BWPs configured, multiple BWPs activated, transmission of PUSCH on one or more BWPs.
Option 1b: Multiple BWPs configured, multiple BWPs activated, transmission of PUSCH on single BWP.
Option 2: Multiple BWPs can be configured, single BWP activated, UE transmits PUSCH on a single BWP if CCA is successful at the UE for the whole BWP.
Option 3: Multiple BWPs can be configured, single BWP activated, UE transmits PUSCH on parts or whole of single BWP where CCA is successful at the UE.

It is noted that CCA is declared to be successful or not in multiples of 20 MHz.

Rel-15 NR BWP switching time (hundreds of microseconds, with minimum of 725 μs for faster TYPE-1 UEs with 60 kHz sub-carrier spacing (SCS) according to R4-1814069) has clearly a different order of magnitude than a single CCA (for example, 9 μs) in LBT procedure. This poses constraints on how BWP operation and LBT can interact, and NR-U BW switching time is a subject for further investigations. Hence, how fast switching time can be supported in UL, such as with Option 3, is currently open. It may be possible that Option 3 does not require RF retuning, nor change of base-band parameters, and, therefore, our assumption is that switching time for Option 3 will be zero or close to zero. We will also illustrate the embodiments assuming Option 3.

II. Rel-15 NR PUCCH Resource Determination for UCI

Uplink control information (UCI) includes, for example but is not limited to, HARQ feedback, scheduling request, and/or CSI report(s). HARQ feedback may contain transport block or code block group-based ACK/NACK.

In Rel-15 NR, a DL assignment contains up to a 3-bit PDSCH-to-HARQ feedback timing field indicating K1, the time offset (in slots) between the associated PDSCH slot and a slot in which a UE transmits the corresponding HARQ feedback. The field values may be configured or predetermined. The UE determines the slot for HARQ feedback based on this field as well as on the indicated PDSCH timing K0. The UE includes into the HARQ codebook all HARQ feedback indicated to be transmitted in the same slot. In Rel-16 URLLC enhancement, multiple separate HARQ feedback transmissions in a slot may be supported, meaning that a HARQ feedback timing mechanism with sub-slot accuracy may be introduced.

In Rel-15 NR, a UE can be configured with multiple PUCCH resources. As part of the configuration, the PUCCH resources can be grouped into up to four PUCCH resource sets. A configurable range of UCI payloads (first set of PUCCH resources is limited to support a fixed UCI payload range of one or two UCI bits) is associated with each PUCCH resource set. Each PUCCH resource set may contain up to eight PUCCH resources (first set of PUCCH resources may contain up to thirty-two resources), with an associated PUCCH resource indicator (PRI) value. A PUCCH resource is configured in Rel-15 with frequency location and format, and the time-domain location is part of the format configuration as shown in the two ASN.1 excerpts below:

```
PUCCH-Resouree ::=          SEQUENCE {
    pucch-ResourceId            PUCCH-ResourceId,
    startingPRB                 PRB-Id,
    intraSlotFrequeneyHopping   ENUMERATED { enabled }   OPTIONAL, -- Need R
    secondHopPRB                PRB-Id                    OPTIONAL, -- Need R
    format                      CHOICE {
        format0                     PUCCH-format0,
        format1                     PUCCH-format1,
        format2                     PUCCH-format2,
        format3                     PUCCH-format3,
        format4                     PUCCH-format4
    }
}
PUCCH-format1 ::=           SEQUENCE {
    initialCyclicShift          INTEGER(0..11),
    nrofSymbols                 INTEGER (4..14),
    startingSymbolIndex         INTEGER(0..10),
    timeDomainOCC               INTEGER(0..6)
}
```

When the UE transmits UCI containing HARQ ACK for PDSCH, the UE first determines the PUCCH resource set based on the UCI payload (number of UCI bits and CRC bits). After that, the UE determines the PUCCH resource within the determined PUCCH resource set to be used based on the PUCCH resource indicator value indicated by 3-bit PUCCH resource indicator in the DL assignment. In the case that first PUCCH resource set contains more than eight resources, the PUCCH resource is determined based on PRI and the index of the first control channel element of the DL assignment associated to the HARQ feedback, or more accurately, the latest DL assignment associated to the HARQ feedback transmitted on the PUCCH.

When the UE transmits UCI without HARQ feedback or with HARQ feedback being in response to a PDSCH without a corresponding PDCCH carrying DL assignment, and if the UE has a set of PUCCH resources configured transmission (in parameter multi-CSI-PUCCH-ResourceList) for the transmission, the UE selects the smallest PUCCH resource (PUCCH resource with the smallest number of RB-symbols) for which the number of UCI bits can be multiplexed with a configured maximum code rate.

III. Rel-15 NR PUSCH Selection for UCI

In Rel-15 NR, if the UE would transmit UCI on a PUCCH that overlaps with a PUSCH transmission, the UE will multiplex UCI on a PUSCH (if the specified timeline conditions for multiplexing are satisfied). In the case that the UE transmits multiple PUSCH during one slot, such as on different cells, the PUSCH for UCI multiplexing is selected according to the following rules:

If the UE transmits both configured grant PUSCH and PUSCH scheduled by a DCI, the UE multiplexes UCI to a PUSCH scheduled by the DCI.

If the UE is scheduled to transmit aperiodic CSI or semi-persistent CSI in a PUSCH, the UE will multiplex HARQ feedback (if present in UCI) to the PUSCH and drop PUCCH.

Otherwise, the UE will multiplex UCI to the PUSCH transmitted on a serving cell with the smallest serving cell index. If multiple PUSCHs are transmitted in a slot on the serving cell with the smallest serving cell index, the UCI is multiplexed on the earliest PUSCH on the cell.

IV. Channel Access Procedures Expected for NR-U

A device, such as a gNB or UE, may occupy a channel with transmissions for a limited time. Such a transmission burst, or duration of a transmission burst, is referred to as channel occupancy time (COT) or transmission opportunity (TXOP). The initiating device may share the COT with a responding device. For example, a gNB may initiate a COT and share that COT with UEs for UL transmissions. In other words, the gNB has contended for the channel and once the gNB has obtained access to the channel, it may allow UEs to use a portion of its channel occupancy time for UL transmissions. It is attractive to support UL transmission within gNB-initiated COT, as it supports efficiently scheduled UL, as well as UL FDMA.

In TR 3GPP 38.889 V16.0.0, two channel access schemes are adopted as a baseline for the design of NR-U Listen-Before-Talk (LBT) procedures: a Category 4 energy detection (ED) LBT procedure (according to LBT categorization in 3GPP TR36.889 V13.0.0, "Feasibility Study on Licensed-Assisted Access to Unlicensed Spectrum") and a Category 2 energy detection LBT procedure.

In Cat. 4 LBT, a device contending for channel access generates a random number N uniformly distributed over a contention window (where the size of the contention window depends for example on the channel access priority class of the traffic). Once the UE has measured the channel to be vacant for N times, the device may occupy the channel with transmission. To align the transmission with a slot boundary, the device may need to resort to self-deferral during the LBT procedure. This type of LBT may be performed when initiating a COT.

In Cat. 2 LBT, the device contending for channel access performs single channel measurement within a time interval of e.g. 25 µs before transmission. This type of LBT may be performed by an UE when a gNB shares its COT with the UE, or by the gNB when the gNB continues with DL transmission within a COT. There are also other cases where Cat. 2 LBT may be used as listed in TR 38.889 Section 7.2.1.3.1.

In TR 38.889, Cat 1 Immediate Transmission is also listed as a channel access scheme for a UL burst within a gNB-initiated COT. In this case, the UE may skip the LBT procedure as long as it starts UL transmission within a predetermined time period, e.g., 16 µs after the end of DL transmission or other preceding transmission within the COT.

Similar LBT procedures are also used in LTE LAA/eLAA (except for Cat. 1 Immediate Transmission) as well as in MulteFire.

V. Wideband PUSCH Approach Presented for NR-U

A PUSCH arrangement for wideband NR-U UL transmission may expand over multiple sub-bands. In one approach, separate HARQ processes and, correspondingly, PUSCHs are allocated for each sub-band of UL allocation at the beginning of UL transmission. Hence, in such a scenario, there can be multiple PUSCHs parallel in frequency within the same serving cell. The scenario is illustrated in FIG. 1, where PUSCHs per sub-band are shown for the first slot, while single PUSCH across sub-bands may be used in the following slots.

The Rel-15 NR rules for UCI mapping to PUSCH do not cover such case. Rules for PUSCH selection may be extended to determine to which sub-band PUSCH UCI is multiplexed. The exact rules are outside of the scope of this disclosure, and the rules are referred to as the predefined rules.

Figure 2:
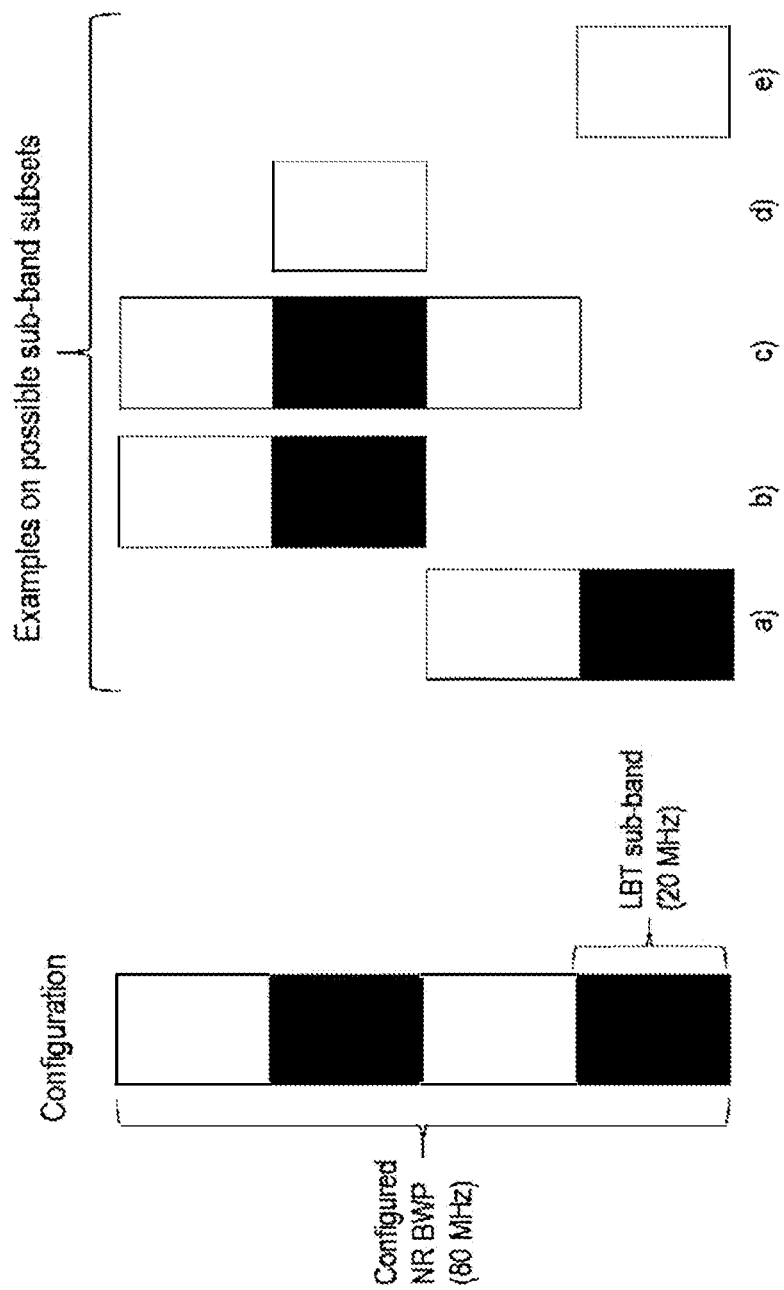
FIG. 2 is an illustration of sub-band subsets of a configured BWP.

The present disclosure is concerned with a case where wideband NR-U operation (with multiples of sub-bands, each having a bandwidth of, for example, 20 MHz) is applied, and transmission bandwidth and frequency location may be adjusted dynamically, for example according to 3GPP TR 38.889 Option 3 both in DL and UL. Especially, resource determination for PUCCH is considered in the present disclosure. Dynamic adjustment of transmission BW and location improves channel access efficiency, since transmission may occur in unoccupied parts of a BWP even if the channel is occupied in other parts of the BWP. This is illustrated in FIG. 2. As seen in FIG. 2, transmission may occur on a subset a, b, c, d, or e of sub-bands of a BWP. In FIG. 2, only transmission BW of contiguous sub-bands are shown; however, it should be appreciated that embodiments of the present disclosure may also apply in a scenario where discontinuous sub-bands are used.

One of the benefits of Option 3 in 3GPP TR 38.889 for dynamic adjustment is that a separate BWP configuration is not needed for all possible sub-band combinations. This is beneficial as a BWP configuration contains a relatively large number of parameters, which are mostly common for all sub-band combinations within a BWP. In fact, some parameters, such as numerology, must be the same to be able to operate the wideband scenario with the single base-band.

A problem related to UL LBT and addressed here in some embodiments is that some or all of the PUCCH resources configured for UCI transmission may be outside of the set of the UL sub-band set for which UL LBT is successful. In this case, the UE may determine a PUCCH resource that is outside the current UL transmission sub-band set. A similar problem exists in PUSCH selection for UCI multiplexing.

Another problem being addressed in some embodiments occurs with respect to the dynamic DL transmission BW adjustment based on DL LBT. The gNB may share a COT with UEs only for sub-bands within its own DL transmission BW, that is, the sub-bands for which the gNB has successfully performed LBT. Hence, the UL transmission within a gNB-initiated COT needs to be aligned in frequency with the DL transmission. This can of course be taken into account for HARQ feedback by indicating an appropriate PUCCH resource via PRI in the DL assignment. However, one of the key purposes of PRI is to provide a mechanism to avoid PUCCH resource collisions between different UEs reporting UCI on the same slot (in the case that PRI cannot indicate non-overlapping PUCCH resources for the scheduled UEs, the PUCCH resource collision can be avoided only with sub-optimal mechanisms: HARQ feedback is delayed, unnecessary PUSCH is scheduled so that UCI is mapped on PUSCH, DL scheduling of one UE is dropped). The efficiency of this mechanism can be severely degraded if some of the PUCCH resources associated with PRI values are outside the Tx bandwidth of shared COT (in frequency domain).

Figure 3:
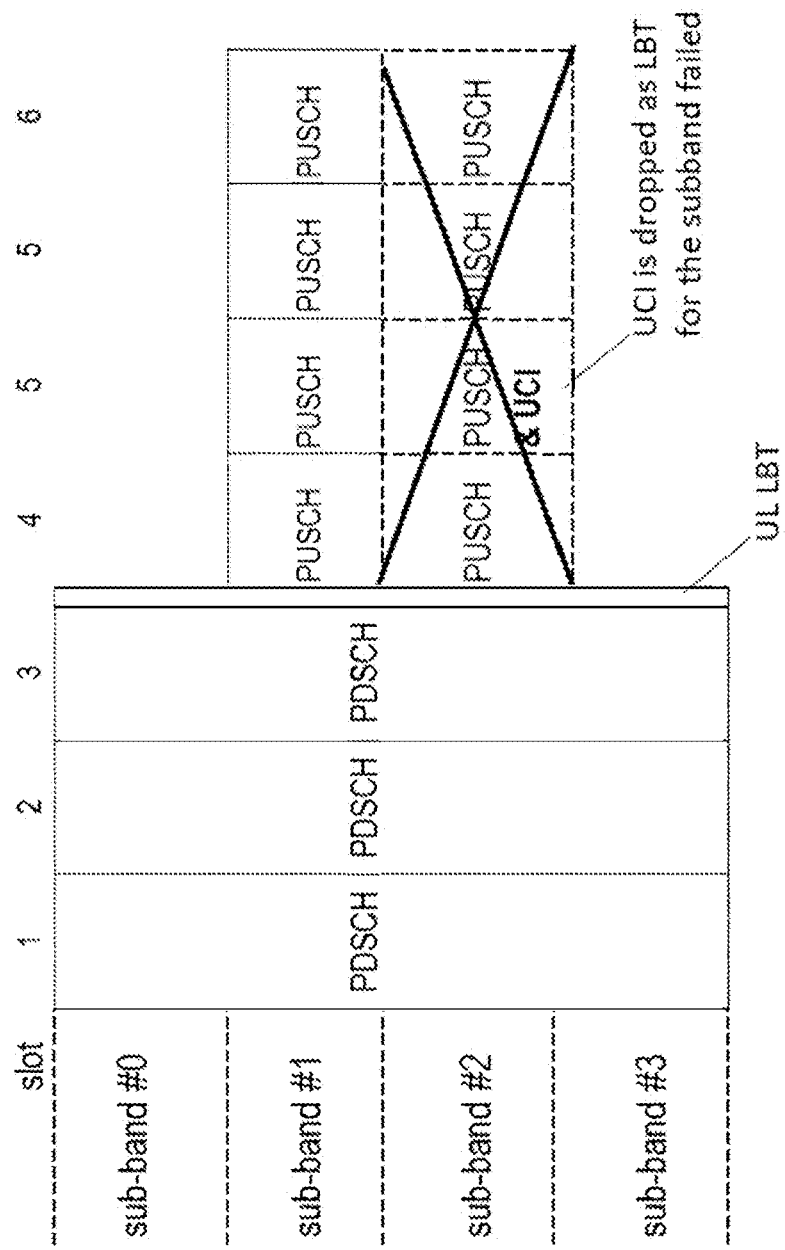
FIG. 3 is an illustration of UCI resource allocation problem when unsuccessful UL LBT blocks some of the sub-bands scheduled for UE.
Figure 4:
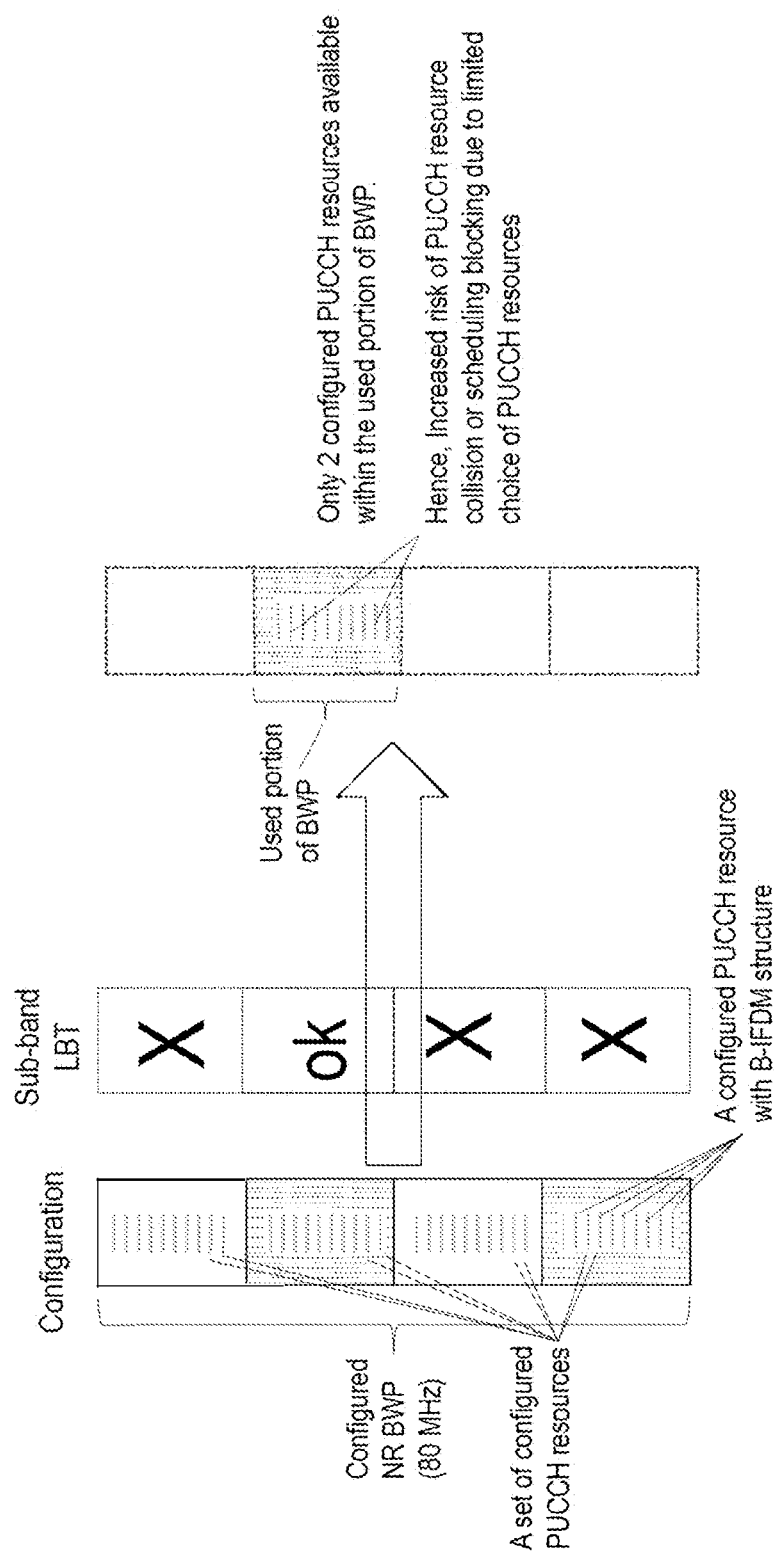
FIG. 4 is an illustration of UCI resource allocation problem when unsuccessful DL LBT blocks some of the sub-bands of BWP for a transmission burst.

These problems are illustrated in FIGS. 3 and 4. FIG. 3 shows a BWP with four sub-bands, and UE is scheduled on two sub-bands. However, UL LBT is successful on only one sub-band, while the LBT fails on the other sub-band. As the sub-band on which LBT fails contains the PUSCH onto which UCI is multiplexed, the UCI transmission is also dropped. FIG. 4 also shows a BWP with four sub-bands, each containing two PUCCH resources (light and dark). If DL LBT (at the gNB) is successful for only one sub-band, then the UE is left with only two PUCCH resource to choose from, and the gNB has very limited ways of avoiding the PUCCH resource collisions between scheduled UEs.

In the present disclosure, it is assumed that RF retuning is not required at the UE to adapt transmission BW after LBT, or that RF retuning is faster than transmission preparation time.

The basic principle in some embodiments of the present disclosure comprises adjusting a PUCCH resource configuration for a BWP including multiple LBT sub-bands, according to sub-band(s) for which channel access is acquired. Different adjustment mechanisms may be used depending on at least one of: the LBT type, and the time difference between the LBT and the UCI transmission. In some embodiments, the LBT type may mean also the link direction for which LBT is performed for as well as the category of the LBT.

In some embodiments, the PUCCH resource configuration may be one of the following alternative types:
  Alt. 1—Configuration of a PUCCH resource (e.g., by PUCCH-Resource and identified by pucch-ResourceId) may include a primary PRB frequency domain allocation (for example, similar to NR Rel-15), as well as $2^{nd}$, $3^{rd}$ etc. priority PRB or sub-band frequency domain allocations for the PUCCH resource.
  Alt. 2—Configuration of a PUCCH resource (e.g., by PUCCH-Resource and identified by pucch-ResourceId) may include a primary PRB frequency domain allocation (for example, similar to NR Rel-15), as well as validity of the resource if one, two, three, or four sub-bands are active. The validity parameter indicates the number(s) of active sub-bands for which the PUCCH resource is valid. For example, a validity parameter value N may indicate that the resource is valid up to N active sub-bands (N=1 would mean that the resource is valid only for 1 active sub-band, 2 would mean that the resource is valid up to 2 active sub-bands, etc.).

Note that in both alternatives, the each PUCCH resource may be restricted to be physically within PRBs of a single sub-band. That is to say, PUCCH may not be configured with PRBs on multiple sub-bands. However, as described above, the sub-band on which the PUCCH resources are located is determined depending on the outcome of the LBT procedure according to embodiments of the present disclosure.

For illustration rather than limitation, embodiments for the following cases will be described:
  Case A: PUCCH resource determination adjustment based on DL LBT outcome, This is relevant for example in case of Cat 1 UL channel access, i.e. Immediate transmission;
  Case B: PUCCH resource determination adjustment based on UL LBT outcome occurring immediately before UCI transmission. This is relevant for example in case of Cat 2 UL channel access, i.e. single shot LBT;
  Case C: PUCCH resource determination adjustment based on UL LBT outcome occurring "early enough" before UCI transmission. This is relevant for example in case of Cat 2 UL channel access.

Case A. PUCCH Resource Adjustment Based on DL Per Sub-Band LBT Outcome

The PRI for HARQ-ACK transmission may be indicated during a DL part of COT to the UE. Hence, adjustment of configured PUCCH resources to current DL transmission BW and frequency location is an efficient way to take the variation(s) of COT transmission BW and frequency location into account.

The UE may determine for a gNB-initiated COT the set of active sub-bands (within the active BWP of the UE) on which DL is transmitted. As an example, the determination may be based on detected reference signal(s)/preamble and/or on detected DCI like DL assignment or group-common DCI. If the UE determines a need to transmit UCI on PUCCH, the UE also determines the PUCCH resource to be used. The determination may be based on UCI payload and an associated PRI.

In case of Alt. 1 PUCCH resource configuration is adopted, the UE determines whether the selected PUCCH resource is located within the active DL sub-band set of a gNB COT. For example, if the selected PUCCH resource according to the primary PRB frequency domain allocation is outside of the active DL sub-band set, the UE assesses whether the 2nd, 3rd, etc. priority PRB allocation for the PUCCH resource configuration is within the active set of sub-bands. In some embodiments, the UE selects the highest priority PRB allocation within the active sub-band set. On the other hand, if the UE does not find any PRB allocation for PUCCH within the active set of sub-bands and the UE is not scheduled with at least partially overlapping PUSCH transmission (at least partially overlapping PUSCH and PUCCH mean that PUSCH and PUCCH transmissions on the same BWP or sub-band would be overlapping in time), the UE may drop the PUCCH transmission.

In case of Alt. 2 PUCCH resource configuration is adopted, the UE may determine which PUCCH resources are valid for an active DL sub-band set, rank or order the valid PUCCH resources in ascending or descending order, and map PRI to the ranked or ordered PUCCH resources. The ranking or ordering may for example be according to the ascending or descending order of the PUCCH resource identifiers (PR-ID). The mapping between resources and (3-bit) PUCCH resource indicator (PRI) may be as shown in the following Table 1.

TABLE 1

Example of PRI to PUCCH resource mapping

| Ranked PUCCH valid Resources | PRI Value |
|---|---|
| $1^{st}$ resource (PR-ID = 2) | 000 |
| $2^{nd}$ resource (PR-ID = 5) | 001 |
| . . . etc. | . . . etc. |
| $8^{th}$ resource (PR-ID = 28) | 111 |

In some embodiments, the UE may determine whether UL LBT is to be performed immediately before UCI transmission, or at least a predefined time gap before the UCI transmission, e.g., in an earlier slot (such as, in a first scheduled slot when UE is scheduled with multiple consecutive UL transmissions and UCI is transmitted in a later slot). Note that in case Cat-1 (i.e., Immediate transmission without LBT) is used for UCI, this operation may be skipped.

Depending on the outcome of the above determination, different actions (Case B or Case C) are taken, as detailed below. By taking different actions, reasonable processing times for the UE are ensured.

Case B. UCI Resource Adjustment Based on UL LBT Timing and Outcome, where the UL LBT Occurs Immediately Before UCI Transmission:

In this case, UL LBT is to be performed immediately before UCI transmission, and therefore, not satisfying the PUCCH preparation time.

In such a case, UCI is multiplexed on the PUCCH resource which may be determined based on PRI and active sub-band set of DL transmissions (similar to that described with reference to Case A, i.e., PUCCH resource adjustment based on DL sub-band LBT outcome). In a special case where PUCCH is (at least partially) overlapping with PUSCH, the UCI is multiplexed on PUSCH selected according to predefined rules among the scheduled PUSCHs.

In some embodiments, UCI is transmitted if UL LBT succeeds for the indicated PUCCH resource sub-band or for all sub-bands overlapping with the PRB allocation of the selected PUSCH. Otherwise UCI is dropped.

In some embodiments, to get more time for PUCCH processing, the UE performs "tentative UL LBT" at a time satisfying the PUCCH preparation time. The "tentative UL LBT" may be performed during a previous TTI, such as a DL slot. To enable "the tentative UL LBT" measurement at the UE, the gNB may configure and indicate some empty resource elements or sub-carriers on each sub-band in the last symbol or symbols of a DL burst.

In "tentative UL LBT", the UE may measure the energy on the channel during the DL transmission (for example at the last symbol or symbols of DL transmission) to estimate whether the ED threshold of subsequent sub-band LBTs will be passed. To facilitate the UE measurements, the gNB leaves some DL sub-carriers unused, so that the UE can just measure the energy on those sub-carriers. The UE selects one or more PUCCH resources based on "tentative UL LBT" and may prepare the transmission according to the methodology defined for Case C which will be described below.

For example, if the outcome of actual UL LBT succeeds for those sub-bands for which the "tentative UL LBT" measurement predicted successful LBT, the UE transmits UCI according to the prepared transmission. Otherwise, UCI is dropped.

In some embodiments, the UE may have PUSCH scheduled on the slots following the UCI. In such embodiments, the UCI may be multiplexed on a PUCCH resource in each of the sub-bands scheduled for PUSCH transmission. In case when PUCCH is (at least partially) overlapping with PUSCH on the same sub-band, UCI is multiplexed on the PUSCH. Otherwise, UCI is transmitted on a PUCCH determined based on LBT outcome as described with reference to Case B.

Case C. UCI Resource Adjustment Based on UL LBT, where the Time Gap Between the UL LBT and the UCI Transmission is Larger than a Predefined Time Threshold Satisfying the PUCCH Preparation Time In some embodiments, Alt. 1 of PUCCH resource configuration may be adopted, and in such a case, the UE may assess whether the determined PRB allocation of the PUCCH resource is present within the set of sub-bands for which the UE had successfully performed UL LBT (UL set of active sub-bands). If the primary PRB frequency domain allocation is outside of the UL set of active sub-bands, the UE assesses whether $2^{nd}$ $3^{rd}$ etc. priority PRB allocation for the PUCCH resource configuration is within the UL set of sub-bands. As an example, the UE may select the highest priority PRB allocation within the active sub-band set.

In some embodiments, Alt. 2 of PUCCH resource configuration may be adopted, and in such a case, the UE may determine whether the PRB allocation of the PUCCH resource is located within the UL set of sub-bands. If the PRB allocation is outside the active UL set of sub-bands, identify valid PUCCH resources based on the number of active UL or DL sub-bands, and map PRI to the closest (in terms of PUCCH resource configuration identifier) valid PUCCH resource.

As an alternative embodiment, UE may determine whether the PRB allocation of the PUCCH resource is located within the UL set of sub-bands. If the PRB allocation is outside the active UL set of sub-bands, the UE determines which PUCCH resources are valid for the active UL sub-band set, and orders the valid PUCCH resources in ascending or descending order of PUCCH resource identifiers and maps PRI to the ordered PUCCH resources.

Similar to that of Case B, in the case of PUSCH (at least partially) overlapping with PUCCH, UCI may be multiplexed on PUSCH selected according to predefined rules among the scheduled PUSCHs within the UL set of sub-bands. The PUSCH may be selected, for example, according to any method specified in Rel-15, and embodiments are not limited to any specific PUSCH selection algorithm.

To facilitate a better understanding, more examples embodiments are provided in the following.

Embodiments with Alt. 1 PUCCH Resource Configuration

In some embodiments where Alt. 1 PUCCH resource configuration is adopted, multiple PRB allocations may be given and are associated with different priorities as illustrated in Table 2 below. In some embodiments, the PRB allocations for all priorities may have equal number of PRBs (which may be configured per PUCCH resource though). Alternatively, or in addition, the PRB allocations may be contiguous or follow block-interlaced FDMA (B-IFDMA), but only one allocation type is used per PUCCH resource configuration. In some embodiments, PRB allocation for each priority may be given for example as a priority-specific starting PRB parameter containing, for example, for interlaced allocation:
    sub-band index and B-IFDMA interlace index (e.g. when interlaces are defined per sub-band), or
    interlace starting PRB index (e.g. when interlace grid spans over whole BWP).

TABLE 2

Example of possible PUCCH resource configuration according to Alt. 1. PUCCH Resource

| PUCCH Resource ID | 3 | | |
|---|---|---|---|
| Continuous/interlaced allocation | Interlaced | | |
| starting PRB | $1^{st}$ priority | $2^{nd}$ priority | $3^{rd}$ priority |
| | PRB L (on sub-band 2) | PRB M (on sub-band 3) | PRB N (on sub-band 1) |
| Format | Format 5 (Comment: Format 5 is given only as an illustrative example as new PUCCH formats may be defined for NR-U) | | |

Embodiments with Alt. 2 PUCCH Resource Configuration

Figure 5:
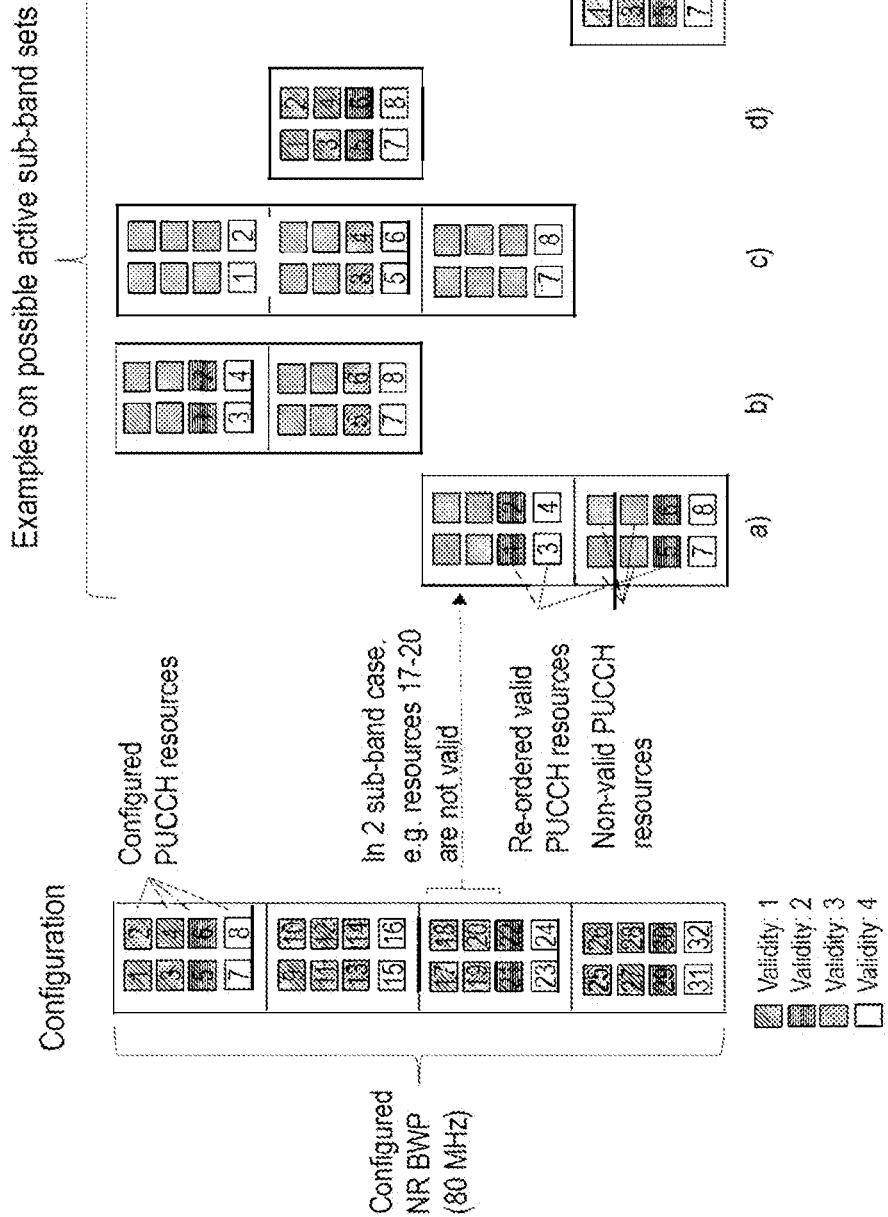
FIG. 5 is an illustration of Alt. 2 resource configuration operation with four sub-bands and eight configured resources per sub-band.

In some embodiments, Alt. 2 PUCCH resource configuration may be adopted. An example of Alt. 2 PUCCH resource configuration is shown in FIG. 5 with N=4 sub-bands for a 3-bit PRI capable to indicate M=8 resources. In some embodiments, the idea is that for each sub-band, up to M PUCCH resources are configured. Once the channel access is obtained to more than single sub-band, the number of valid PUCCH resources per sub-band is reduced so that there are up to M valid PUCCH resources over the active set of sub-bands.

For that purpose, the PUCCH resource configuration may contain a validity parameter indicating the number(s) of active sub-bands for which the PUCCH resource is valid. For example, the validity parameter value N could indicate that the resource is valid up to N active sub-bands (N=1 would mean that the resource is valid only for 1 active sub-band, 2 would mean that the resource is valid up to 2 active sub-bands, etc.).

Embodiments for PUCCH Resource Determination Based on UL LBT

In some embodiments, if UL LBT is to be performed immediately before UCI transmission and not satisfying the PUCCH preparation time, Case B PUCCH resource determination may be applied. For example, UCI is multiplexed on a PUCCH resource in each of the sub-bands scheduled for PUSCH transmission in case that UE has PUSCH scheduled on the following slots (the PUCCH preparation happens before the LBT. As the PUCCH is multiplexed on all sub-bands scheduled for PUSCH, the PUCCH gets transmitted even if only a single sub-band has successful LBT. So this example embodiment provides a diversity against sub-band LBT failure. For that purpose, PUCCH resource for each sub-band may be determined as follows:
    The PUCCH resource configuration indicated by the PRI (and UCI payload) is applied.
    In the case that PRB allocation is given in the form of sub-band index and B-IFDMA interlace index (e.g. when interlaces are defined per sub-band), the B-IFDMA interlace index is used to determine the interlace for all scheduled sub-bands.
    In the case that PRB allocation is given in the form of starting PRB index for interlaced allocation or for contiguous allocation (e.g. when interlace grid spans over whole BWP), a PRB offset between the starting PRB and the edge of the corresponding sub-band is determined. The PRB offset is then applied for all scheduled sub-bands to determine the PUCCH resource location in the multiple sub-bands.

As described above, the present disclosure covers solutions for PUCCH resource adjustment based on DL LBT and PUCCH resource adjustment based on UL LBT, and PUCCH resource adjustment based on both DL LBT and UL LBT. More example embodiments for PUCCH resource adjustment based on DL LBT and/or UL LBT will be described below with reference to FIGS. 7 and 8.

Figure 6:
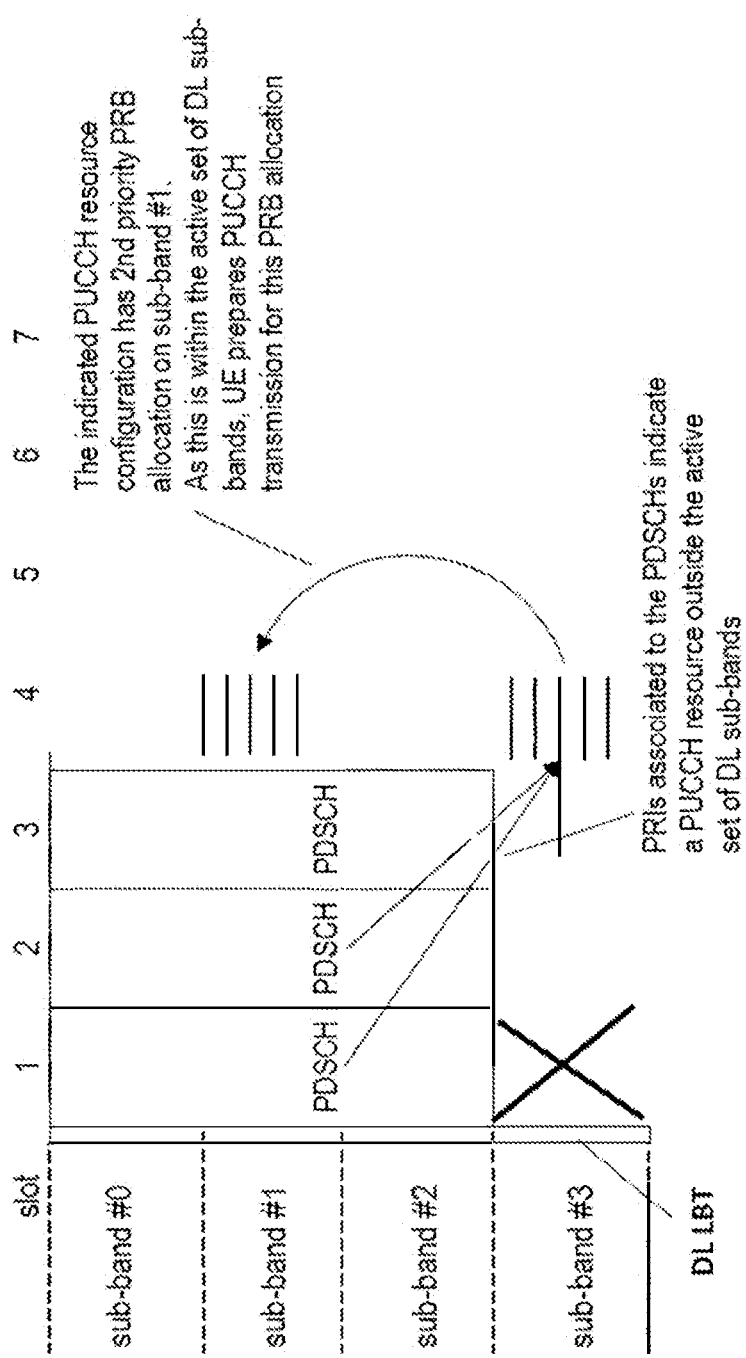
FIG. 6 is an example on PUCCH resource adjustment based on DL LBT.

In FIG. 6, the adjustment is illustrated based on the DL LBT outcome (for Alt. 1). In FIG. 6, the configured BWP contains four sub-bands. However, the DL LBT allows channel access on only three sub-bands. The UE receives DL assignments for PDSCH in slots 1 and 2 of the COT. The PRI contained in the DL assignment points to a PUCCH resource on sub-band #3, which is outside the current COT. However, the PUCCH resource configuration has a $2^{nd}$ priority PRB allocation on sub-band #1. As this is within the active sub-bands of the current COT, the UE prepares to transmit PUCCH on this PRB allocation. In the case of Cat 1 UL channel access, the transmission also occurs on the indicated resource.

Figure 7:
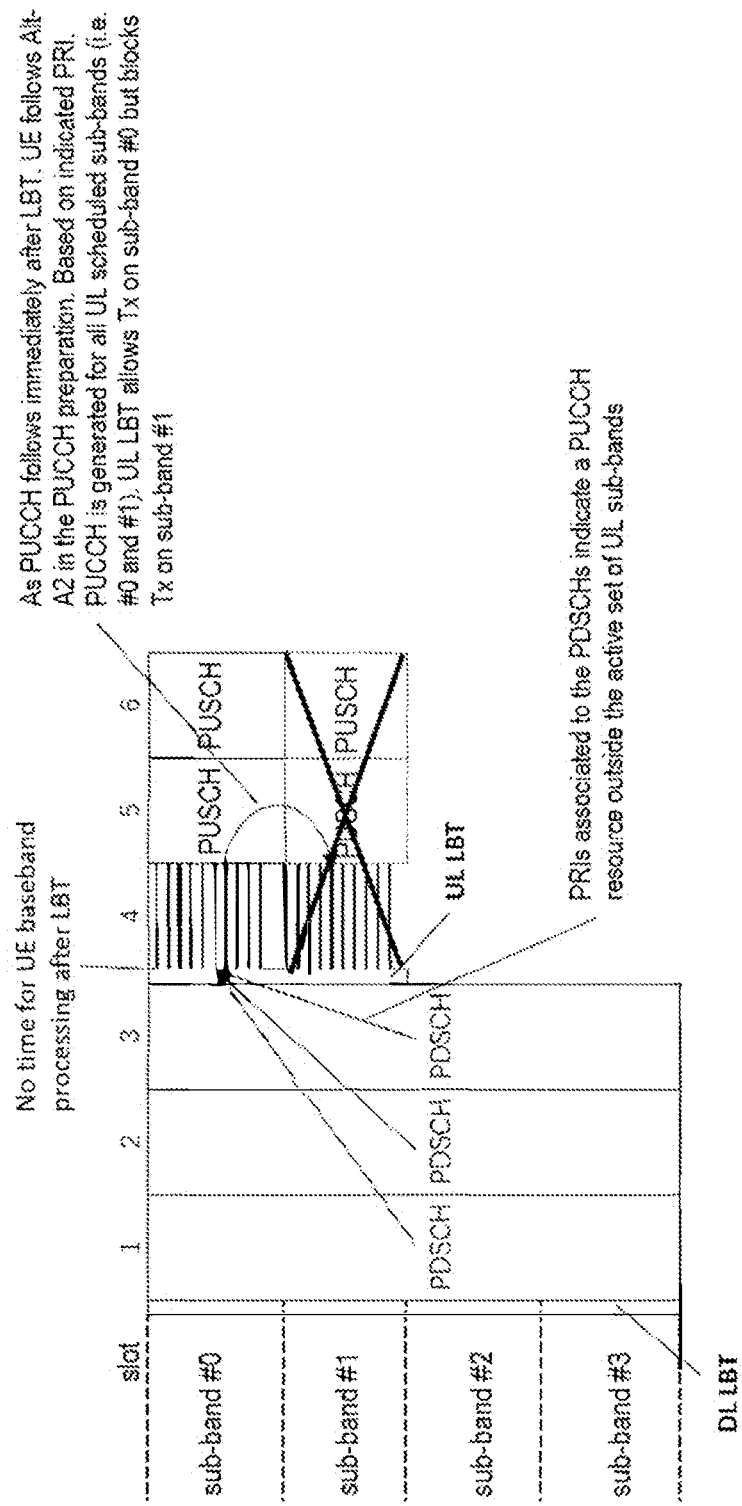
FIG. 7 is an example on PUCCH resource adjustment based on UL LBT.

The case of Cat 2 UL LBT is considered next. In FIG. 7, the PUCCH resource determination according to Case B is illustrated. After receiving a DL assignment for PDSCH as well as UL grant(s) for PUSCH, the UE determines the UL LBT time position. The determination may be based, for example, on the information on the DL assignment and/or Group Common PDCCH (GC PDCCH) containing information on the COT structure. The UE also determines that the time difference between PUCCH and preceding UL LBT is below a threshold. Hence, the UE adapts actions according to Case B. The UE prepares a PUCCH for each sub-band for which the UE has a PUSCH scheduled (sub-bands #0 and #1 in the figure). The PUCCH is prepared according to the PUCCH resource configuration indicated by the PRI as well as the UCI payload size. Also, the PRB allocation within each sub-band is given by the PUCCH resource configuration.

In the example shown in FIG. 7, UL LBT provides channel access for sub-band #0, but fails for sub-band #1. Correspondingly, UE transmits the prepared PUCCH on the sub-band #0 but drops the PUCCH prepared for sub-band #1 (if both sub-bands would have succeeded, the UE would have transmitted prepared PUCCH via both sub-bands).

Figure 8:
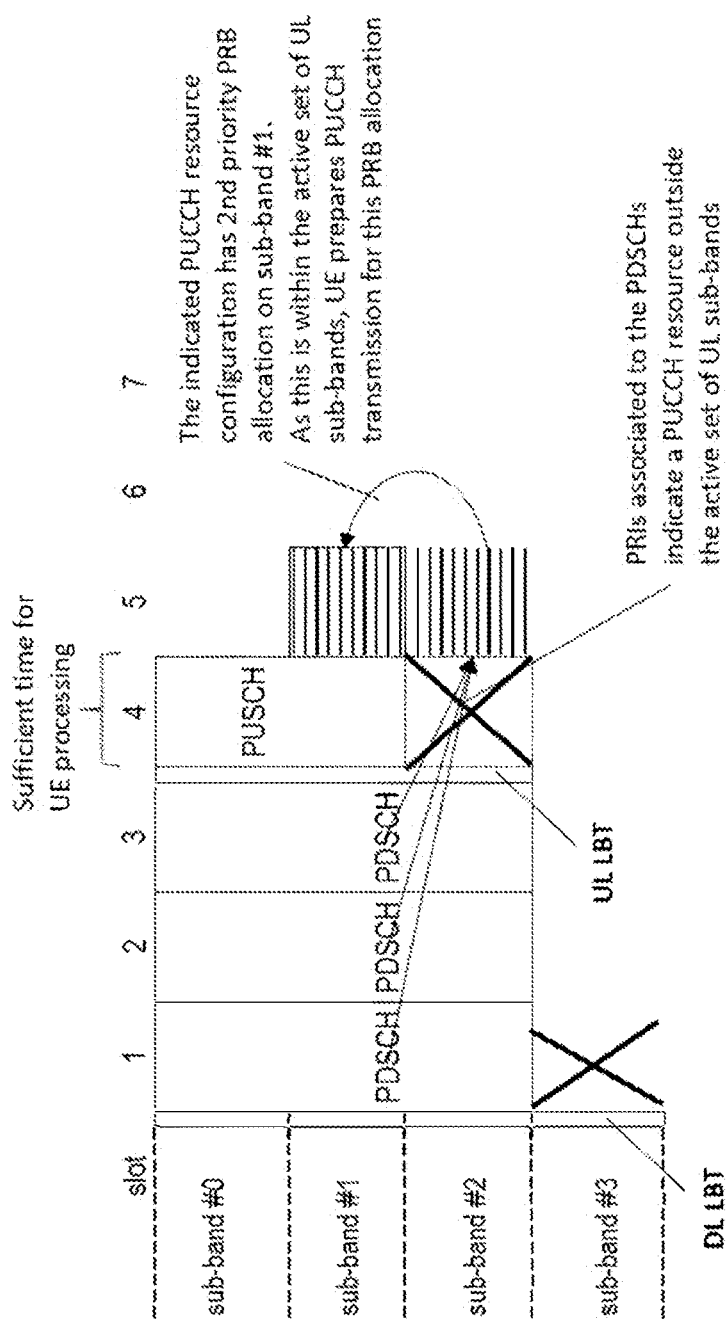
FIG. 8 is an example on PUCCH resource adjustment based on DL LBT

In FIG. 8, the PUCCH resource determination based on UL LBT and according to Case C (Alt. 1) is illustrated. After receiving DL assignment for PDSCH as well as UL grant(s) for PUSCH, the UE determines the UL LBT time position. The determination may be based, for example, on the information on the DL assignment and/or Group Common PDCCH (GC PDCCH) containing information on the COT structure. The UE also determines that the time difference between PUCCH and preceding UL LBT is above a threshold, and the UE has enough time to adjust PUCCH based on LBT outcome. Hence, the UE adapts actions according to Case C (Alt. 1 in this example). In FIG. 8, the UE has PUSCH (preceding PUCCH) scheduled on three sub-bands. However, the UL LBT allows channel access only on two sub-bands. The PRI contained in the DL assignment points to a PUCCH resource on sub-band #2, which is outside the current UL transmission BW. However, the PUCCH resource configuration has a $2^{nd}$ priority PRB allocation on sub-band #1. As this is within the current UL transmission BW, the UE prepares PUCCH and transmits it on this PRB allocation.

Some of the main UE steps according to the some of the example embodiments are:

Step 1: When transmitting UCI, the UE determines whether LBT is performed immediately before UCI transmission, or at least a predefined time gap before the UCI transmission.
 LBT may be UL LBT (such as when the UE is scheduled with multiple consecutive UL transmissions) or DL LBT carried out by a gNB at beginning of gNB-initiated COT.

Step 2: If LBT is performed immediately before UCI transmission (that is, UL LBT),
 UCI is multiplexed on the selected PUCCH resource with PRB allocation determined before the LBT.
 PUCCH resource selection may be based on UCI payload and, possibly, on PRI in DL assignment.
 In the case of PUSCH (at least partially) overlapping with the PUCCH, UCI is multiplexed on PUSCH selected according to NR rules among the scheduled PUSCHs.

Step 3: If LBT is performed at least a predefined time gap before the UCI transmission (that is, UL LBT or DL LBT),
 UE selects the highest priority PRB allocation of the PUCCH resource that is within the set of sub-bands for which channel is assessed to be available by the LBT.
 If such allocation is not found, UCI transmission is dropped.
 In the case of PUSCH (at least partially) overlapping with PUCCH, UCI is multiplexed on PUSCH selected according to NR rules among the scheduled PUSCHs within the set of sub-bands.

Step 4: UCI is transmitted.
 In the case that Step 3 was DL LBT and UL LBT is performed, transmission is conditioned that the channel is assessed to be available by the UL LBT on the sub-bands containing the PRBs used for UCI transmission.

Alternatively, for Step 2, UCI is multiplexed on a PUCCH resource in each of the sub-bands scheduled for PUSCH transmission in the following slots. In case when PUCCH is (at least partially) overlapping with PUSCH on the same sub-band, UCI is multiplexed on the PUSCH.

Alternatively, for Step 3, UE determines which PUCCH resources are valid for active DL sub-band set, and orders the valid PUCCH resources in ascending or descending order of PUCCH resource identifier and maps PRI to the ordered PUCCH resources.

Alternatively, for Step 3, UE determines whether the PRB allocation of the PUCCH resource is located within the UL set of active sub-bands. If the PRB allocation is outside the active UL set of sub-bands, UE determines which PUCCH resources are valid for active UL sub-band set and orders the valid PUCCH resources in ascending or descending order of the PUCCH resource identifier and maps PRI to the ordered PUCCH resources.

Advantages:

The present disclosure introduces a UCI reporting mechanism capable of supporting the adaptive NR-U BWP operation with improved UCI transmission. This means:

Increased UCI transmission reliability and HARQ feedback latency as HARQ feedback retransmissions occur less frequently.

Reduced PUCCH collision probability between UEs or need for suboptimal mechanisms to avoid PUCCH collision.

UE can prepare the UCI transmission beforehand and dropping may only occur after UL LBT.

Figure 9:
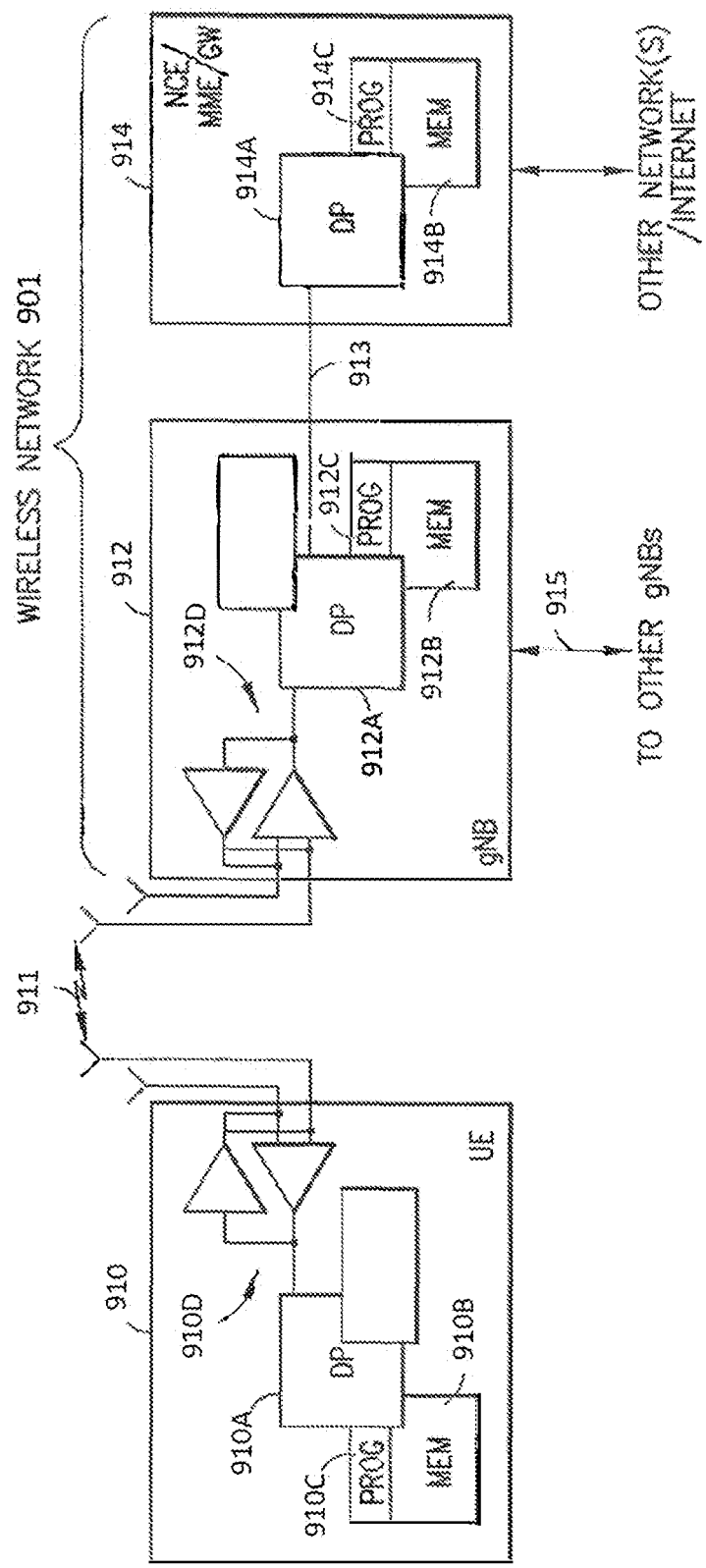
FIG. 9 shows a simplified block diagram of certain apparatus according to various example embodiments of the present disclosure.

Reference is now made to FIG. 9 for illustrating a simplified block diagram of various electronic devices and apparatus that are suitable for use in practicing an example embodiment of the present disclosure. In FIG. 9, a wireless network 901 is adapted for communication over a wireless link 911 with an apparatus, such as a mobile communication device, which is referred to as a UE 910, via a wireless network access node, such as a base station or relay station or remote radio head, and more specifically shown as a gNodeB (gNB) 912. The network 901 may include a network control element (NCE) 914, which serves as an access and mobility management function or entity (AMF or MME) and/or a serving gateway (S-GW) to a broader network, such as a public switched telephone/data network and/or the Internet.

The UE 910 includes a controller, such as a computer or a data processor (DP) 910A, a computer-readable memory medium embodied as a memory (MEM) 910B, which stores a program of computer instructions (PROG) 910C, and a suitable radio frequency (RF) transmitter and receiver 910D for bi-directional wireless communications with the gNodeB (gNB) 912 via one or more antennas. The gNodeB 912 also includes a controller, such as a computer or a data processor (DP) 912A, a computer-readable memory medium embodied as a memory (MEM) 912B that stores a program of computer instructions (PROG) 912C, and a suitable RF transmitter and receiver 912D for communication with the UE 910 via one or more antennas. The gNodeB 912 is coupled via a data/control path 913 to the NCE 914. The path 913 may be implemented as an S1 interface when the network 901 is an LTE network. The gNodeB 912 may also be coupled to another gNodeB via data/control path 915, which may be implemented as an X2 interface when the network 901 is an LTE network.

At least one of the PROGs 910C and 912C is assumed to include program instructions that, when executed by the associated DP, enable the device to operate in accordance with the example embodiments of this disclosure as was detailed above with respect to FIGS. 5 to 8. That is, example embodiments of this disclosure may be implemented at least in part by computer software executable by the DP 910A of the UE 910 and/or by the DP 912A of the gNodeB 912, or by hardware, or by a combination of software and hardware (and firmware).

In general, the various embodiments of the UE 910 can include, but are not limited to, cellular telephones; personal digital assistants (PDAs) having wireless communication capabilities; portable computers having wireless communication capabilities; image capture devices, such as digital cameras, having wireless communication capabilities; gaming devices having wireless communication capabilities; music storage and playback appliances having wireless communication capabilities; and Internet appliances permitting wireless Internet access and browsing, as well as portable units or terminals that incorporate combinations of such functions.

The computer-readable MEMs 910B, 912B, 914B may be of any type suitable to the local technical environment and may be implemented using any suitable data storage technology, such as semiconductor-based memory devices, flash memory, magnetic-memory devices and systems, optical-memory devices and systems, fixed memory and removable memory. The DPs 910A, 912A, 914A may be of any type suitable to the local technical environment, and may include one or more of general purpose computers, special purpose computers, microprocessors, digital signal processors (DSPs) and processors based on a multicore processor architecture, as non-limiting examples.

It should be noted that the various DPs 910A, 912A, 914A may be implemented as one or more processors/chips, either or both of the UE 910 and the gNodeB 912 may include more than one transmitter and/or receiver 910D, 912D, and particularly the gNodeB 912 may have its antennas mounted remotely from the other components of the gNodeB 912, such as for example tower-mounted antennas.

Figure 10:
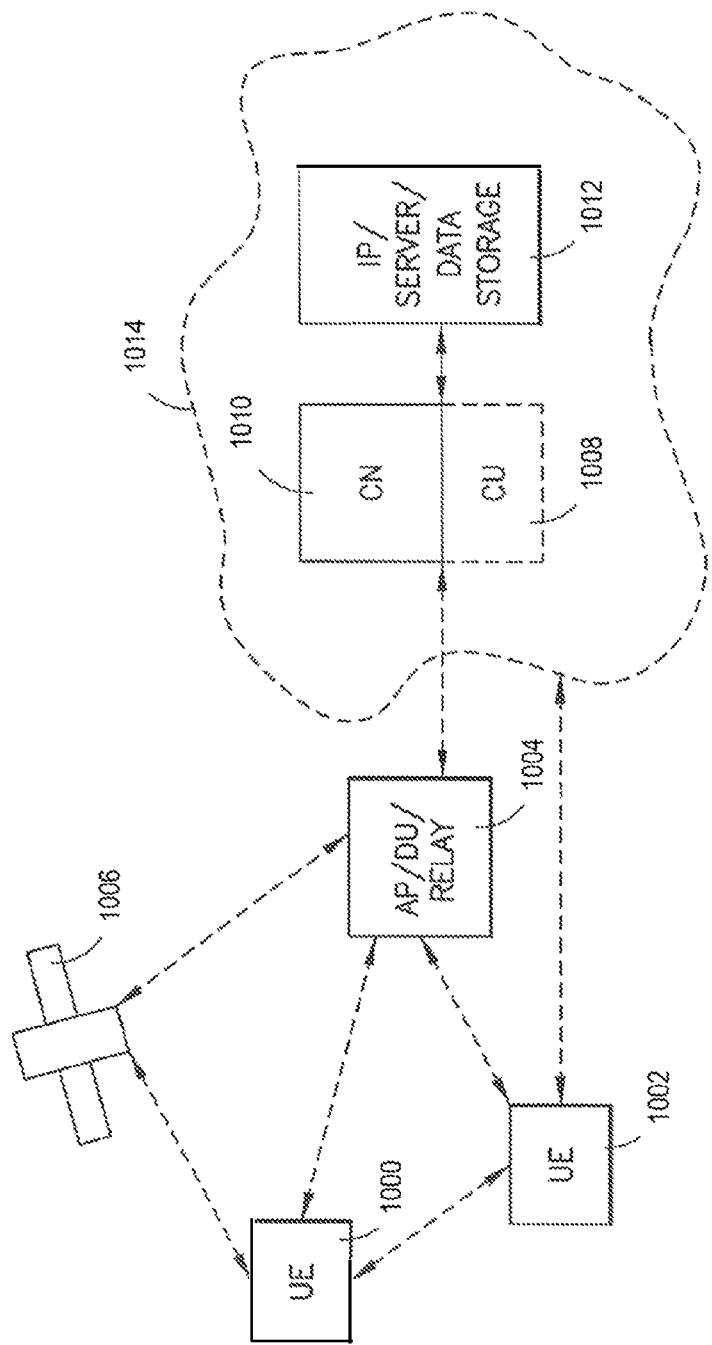
FIG. 10 shows part of another example radio network.

Reference is now made to FIG. 10 for illustrating a simplified block diagram of various electronic devices and apparatus that are suitable for use in practicing another example embodiment of the present disclosure. In the following, different example embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), and Internet Protocol multimedia subsystems (IMS) or any combination thereof.

FIG. 10 depicts examples of simplified system architectures only showing some elements and functional entities, all being logical units, whose implementation may differ from what is shown. The connections shown in FIG. 10 are logical connections; the actual physical connections may be different. It is apparent to a person skilled in the art that the system typically comprises also other functions and structures than those shown in FIG. 10.

The embodiments are not, however, restricted to the system given as an example, but a person skilled in the art may apply the solution to other communication systems provided with necessary properties.

The example of FIG. 10 shows a part of an example radio access network.

FIG. 10 shows user devices 1000 and 1002 configured to be in a wireless connection on one or more communication channels in a cell with an access node (such as (e/g)NodeB) 1004 providing the cell. The physical link from a user device to a/an (e/g)NodeB is called uplink or reverse link and the physical link from the (e/g)NodeB to the user device is called downlink or forward link. It should be appreciated that (e/g)NodeBs or their functionalities may be implemented by using any node, host, server, or access point, etc., entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system to which it is coupled. The NodeB may also be referred to as a base station, an access point, or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 1010 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in an Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 10, user devices may include two antennas. The number of reception and/or transmission antennas may naturally vary according to a current implementation.

Additionally, although the apparatuses have been depicted as single entities, different units, processors and/or memory units (not all shown in FIG. 10) may be implemented.

5G enables the use of multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC)), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 1012, or utilize services provided by them. The communication network may also be able to support the usage of cloud services, for example, at least part of core network operations may be carried out as a cloud service (this is depicted in FIG. 10 by "cloud" 1014). The communication system may also comprise a central control entity, or the like, providing facilities for networks of different operators to cooperate, for example, in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 1004) and non-real time functions being carried out in a centralized manner (in a centralized unit, CU 1008).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example, by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 1006 in the mega-constellation may cover several satellite-enabled network entities that create on-ground cells. The on-ground cells may be created through an on-ground relay node 1004 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home (e/g)nodeB. Additionally, in a geographical area of a radio communication system, a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 10 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home node B gateway, or HNB-GW (not shown in FIG. 10). An HNB Gateway (HNB-GW), which is typically installed within an operator's network may aggregate traffic from a large number of HNBs back to a core network.

Figure 11:
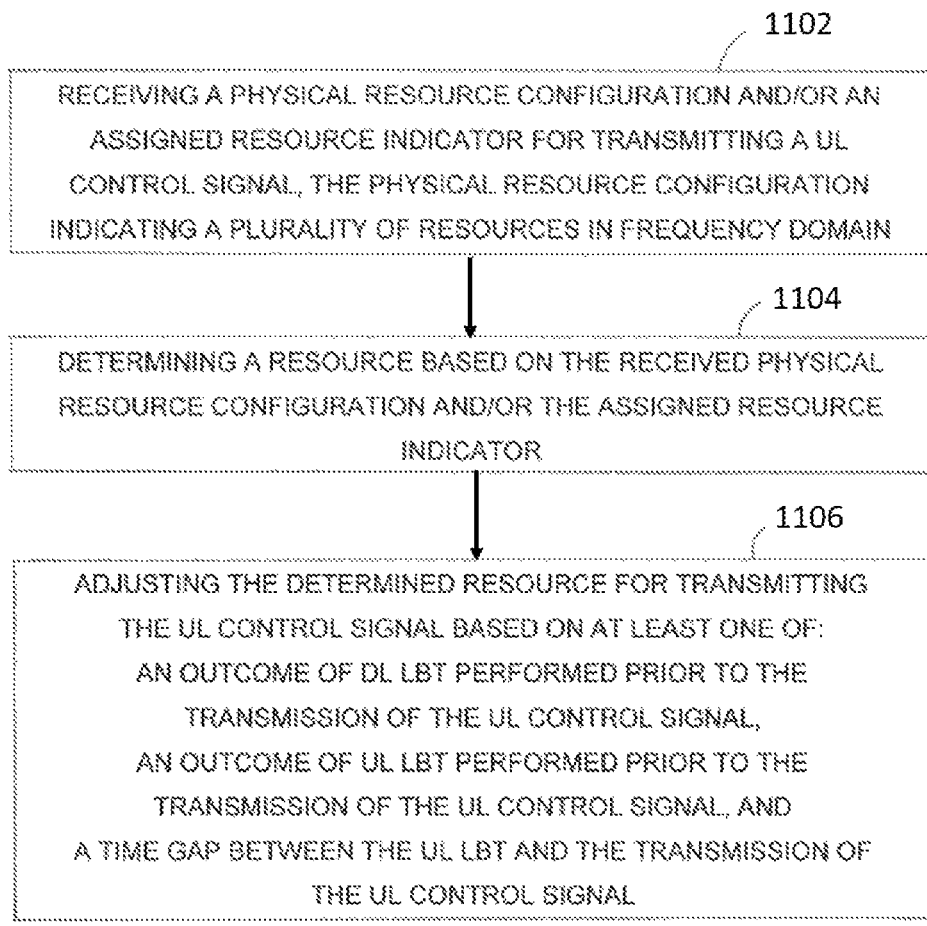
FIG. 11 is a flow chart illustrating a method performed by a user equipment in accordance with the present disclosure.

FIG. 11 is a flow chart illustrating a method performed by a user equipment in accordance with the present disclosure. In block 1102, the user equipment receives a physical resource configuration and/or an assigned resource indicator for transmitting a UL control signal, the physical resource configuration indicating a plurality of resources in frequency domain. In block 1104, the user equipment determines a resource based on the received physical resource configuration and/or the assigned resource indicator. In block 1106, the user equipment adjusts the determined resource for transmitting the UL control signal based on at least one of: an outcome of DL LBT performed prior to the transmission of the UL control signal, an outcome of UL LBT performed prior to the transmission of the UL control signal, and a time gap between the UL LBT and the transmission of the UL control signal.

Figure 12:
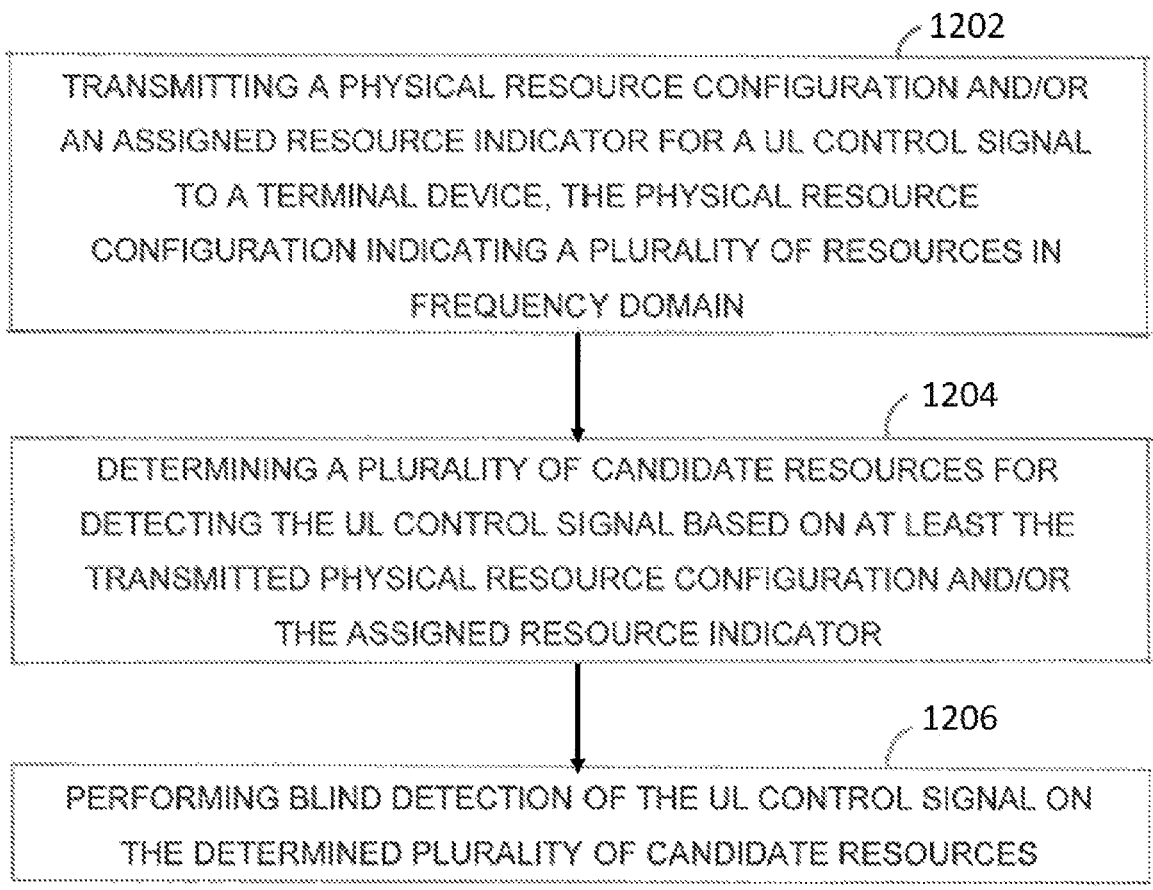
FIG. 12 is a flow chart illustrating a method performed by a base station in accordance with the present disclosure.

FIG. 12 is a flow chart illustrating a method performed by a base station in accordance with the present disclosure. In block 1202, the base station transmits a physical resource configuration and/or an assigned resource indicator for a UL control signal to a terminal device, the physical resource configuration indicating a plurality of resources in frequency domain. In block 1204, the base station determines a plurality of candidate resources for detecting the UL control signal based on at least the transmitted physical resource configuration and/or the assigned resource indicator. In block 606, the base station performs blind detection of the UL control signal on the determined plurality of candidate resources.

It should be appreciated that descriptions related to physical resource configuration (e.g., Alt. 1 and/or Alt.2 configuration type as an example) and/or adjustment of the determined resource for transmitting the UL control signal which are provided above with reference to FIGS. 5 to 10 also apply here, and will not be repeated.

In general, the various example embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the disclosure is not limited thereto.

While various aspects of example embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the example embodiments of the disclosures may be practiced in various components, such as integrated circuit chips and modules, and that example embodiments of this disclosure may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the example embodiments of this disclosure.

Various modifications and adaptations to the foregoing example embodiments of this disclosure may become apparent to those skilled in the relevant arts in view of the foregoing description, when read in conjunction with the accompanying drawings. For example, while example embodiments have been described above in the context of advancements to the 5G NR system, it should be appreciated that example embodiments of this disclosure are not limited for use with only this one particular type of wireless communication system. Various embodiments of the disclosure presented herein are just provided as examples and not exhaustive or otherwise limiting of the scope of the disclosure.

The following abbreviations have been used in the preceding discussion:

ACK Acknowledgement
ASN.1 Abstract Syntax Notation 1
B-IFDMA Block Interlaced Frequency Division Multiple Access
BW Bandwidth
BWP Bandwidth Part
Cat. Category
CCA Clear Channel Assessment
COT Channel Occupancy Time
CSI Channel State Information
DCI Downlink Control Information
DL Downlink
DSP Digital Signal Processor
eLAA Evolved License Assisted Access
ETSI European Telecommunications Standards Institute
FDMA Frequency Division Multiple Access
FFT Fast Fourier Transform
GC Group Common
gNB gNodeB, 5G Node B, base station
HARQ Hybrid Automatic Repeat Request
LAA License-Assisted Access
LBT Listen-Before-Talk
LTE Long Term Evolution
MTC Machine-Type Communications
NACK Negative Acknowledgement
NR New Radio
NR-U New Radio Unlicensed
NW Network
PDA Personal Digital Assistant
PDCCH Physical Downlink Control Channel
PDSCH Physical Downlink Shared Channel
PRB Physical Resource Block
PRI PUCCH resource indicator
PUCCH Physical Uplink Control Channel
PUSCH Physical Uplink Shared Channel
RF Radio Frequency
RRC Radio Resource Control
SCS Sub-Carrier Spacing
SI Study Item
TDD Time Division Duplex
TXOP Transmission Opportunity
UCI Uplink Control Information
UE User Equipment
UL Uplink
URLLC Ultra-Reliable Low-Latency Communication The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this disclosure.

Although described in the context of particular embodiments, it will be apparent to those skilled in the art that a number of modifications and various changes to these teachings may occur. Thus, while the disclosure has been particularly shown and described with respect to one or more embodiments thereof, it will be understood by those skilled in the art that certain modifications or changes may be made therein without departing from the scope of the disclosure as set forth above, or from the scope of the claims to follow.

The invention claimed is:

1. A method for determining a Physical Uplink Control Channel (PUCCH) resource for transmitting an uplink (UL) control signal, the method comprising:
    receiving at least one physical resource configuration for transmitting the UL control signal, the physical resource configuration comprising an indication of a plurality of PUCCH resources in a frequency domain;
    determining a PUCCH resource based on the received at least one physical resource configuration;
    adjusting the determined PUCCH resource for transmitting the UL control signal in response to an UL listen before talk (LBT) failure prior to the transmission of the UL control signal, wherein adjusting the determined PUCCH resource for transmitting the UL control signal is based on an outcome of the UL LBT performed before the transmission of the UL control signal, and a time gap between the UL LBT and the transmission of the UL control signal is longer than a predefined threshold; and
    transmitting the UL control signal using the adjusted PUCCH resource.

2. The method according to claim 1, wherein the physical resource configuration further comprises a primary physical resource block (PRB) allocation, and at least one of a second priority PRB or a sub-band allocation for transmitting the UL control signal.

3. The method according to claim 2, wherein adjusting the determined PUCCH resource for transmitting the UL control signal comprises:
    determining whether at least one physical resource block (PRB) allocation of the determined PUCCH resource is located within an active downlink (DL) sub-band set of a channel occupancy time (COT); and
    in response to the at least one PRB allocation of the determined PUCCH resource being located within the active DL sub-band set of the COT, determining to use the at least one PRB allocation of the determined resource for transmitting the UL control signal; or
    in response to each PRB allocation of the determined PUCCH resource being located outside of the active DL sub-band set of the COT, determining to drop the UL control signal.

4. The method according to claim 1, wherein the physical resource configuration further comprises a physical resource block (PRB) allocation, and a validity value indicating a number of active sub-bands in which a resource for the UL control signal is valid.

5. The method according to claim 1, wherein the method further comprises:
    as a preprocessing before the transmission, multiplexing the UL control signal on a candidate PUCCH resource determined based on an outcome of a downlink (DL) LBT or an outcome of a tentative UL LBT performed during a previous time instance; and
    wherein adjusting the determined PUCCH resource for transmitting the UL control signal comprises:
    performing UL LBT immediately before the transmission of the UL control signal; and
    in response to the UL LBT succeeding in the candidate resource, determining the candidate PUCCH resource as the resource for transmitting the UL control signal.

6. The method according to claim 1, wherein adjusting the determined PUCCH resource comprises:
    determining whether the UL LBT succeeds in at least one physical resource block (PRB) allocation of the determined PUCCH resource; and
    in response to the UL LBT succeeding in the at least one PRB allocation of the determined PUCCH resource, determining to use the at least one PRB allocation of the determined resource for transmitting the UL control signal; or
    in response to the UL LBT failing in each PRB allocation of the determined PUCCH resource, determining to drop the UL control signal.

7. The method according to claim 1, wherein adjusting the determined PUCCH resource comprises:
    determining whether the UL LBT succeeds in at least one physical resource block (PRB) allocation of the determined PUCCH resource; and
    in response to the UL LBT succeeding in the at least one PRB allocation of determined PUCCH resource, determining to use the determined PUCCH resource for transmitting the UL control signal; and/or
    in response to the UL LBT failing:
        determining a set of PUCCH resources from a plurality of PUCCH resources located within an active UL sub-band set of a channel occupancy time and
        determining a PUCCH resource for transmitting the UL control signal from the determined set of PUCCH resources by selecting a PUCCH resource with a resource identifier value closest to a resource identifier value of the determined PUCCH resource.

8. The method according to claim 1, wherein adjusting the determined PUCCH resource comprises:
    determining whether the UL LBT succeeds in at least one physical resource block (PRB) allocation of determined PUCCH resource; and
    in response to the UL LBT succeeding in the at least one PRB allocation of determined PUCCH resource, determining to use the determined PUCCH resource for transmitting the UL control signal; and/or in response to the UL LBT failing:
- determining valid PUCCH resources from a plurality of PUCCH resources located within an active UL sub-band set of a channel occupancy time,
- mapping the valid PUCCH resources to corresponding resource indicators and
- determining a PUCCH resource for transmitting the UL control signal based on a resource indicator assigned by a network node.

9. An apparatus for determining a Physical Uplink Control Channel (PUCCH) resource for transmitting an uplink (UL) control signal, the apparatus comprising:
- at least one processor; and
- at least one memory including computer program code, the at least one memory and the computer program code being configured, with the at least one processor, to cause the apparatus to perform the following:
- receive at least one physical resource configuration for transmitting the UL control signal, the physical resource configuration comprising an indication of a plurality of PUCCH resources in a frequency domain;
- determine a PUCCH resource based on the received at least one physical resource configuration or the assigned resource indicator;
- adjust the determined PUCCH resource for transmitting the UL control signal in response to an UL listen before talk (LBT) failure prior to the transmission of the UL control signal, wherein adjusting the determined PUCCH resource for transmitting the UL control signal is based on an outcome of the UL LBT performed before the transmission of the UL control signal, and a time gap between the UL LBT and the transmission of the UL control signal is longer than a predefined threshold; and
- transmit the UL control signal using the adjusted PUCCH resource.

10. The apparatus according to claim 9, wherein the physical resource configuration further comprises a primary physical resource block (PRB) allocation, and at least one of a second priority PRB or a sub-band allocation for transmitting the UL control signal.

11. The apparatus according to claim 10, wherein adjusting the determined resource for transmitting the UL control signal comprises:
- determining whether at least one physical resource block (PRB) allocation of the determined PUCCH resource is located within an active downlink (DL) sub-band set of a channel occupancy time (COT); and
- in response to the at least one PRB allocation of the determined PUCCH resource being located within the active DL sub-band set of the COT, determining to use the at least one PRB allocation of the determined resource for transmitting the UL control signal; or
- in response to each PRB allocation of the determined PUCCH resource being located outside of the active DL sub-band set of the COT, determining to drop the UL control signal.

12. The apparatus according to claim 9, wherein the physical resource configuration further comprises a physical resource block (PRB) allocation, and a validity value indicating a number of active sub-bands in which a resource for the UL control signal is valid.

13. The apparatus according to claim 9, wherein the at least one memory and the computer program code are further configured, with the at least one processor, to cause the apparatus to perform:
- as a preprocessing before the transmission, multiplexing the UL control signal on a candidate PUCCH resource determined based on an outcome of downlink (DL) LBT or an outcome of a tentative UL LBT performed during a previous time instance; and
- wherein adjusting the determined PUCCH resource for transmitting the UL control signal comprises:
- performing UL LBT immediately before the transmission of the UL control signal; and
- in response to the UL LBT succeeding in the candidate resource, determining the candidate PUCCH resource as the resource for transmitting the UL control signal.

14. The apparatus according to claim 9, wherein adjusting the determined PUCCH resource comprises:
- determining whether the UL LBT succeeds in at least one physical resource block (PRB allocation of the determined PUCCH resource; and
- in response to the UL LBT succeeding in the at least one PRB allocation of the determined PUCCH resource, determining to use the at least one PRB allocation of the determined resource for transmitting the UL control signal; and
- in response to the UL LBT failing in each PRB allocation of the determined PUCCH resource, determining to drop the UL control signal.

15. The apparatus according to claim 9, wherein adjusting the determined PUCCH resource comprises:
- determining whether the UL LBT succeeds in at least one physical resource block (PRB) allocation of the determined PUCCH resource; and
- in response to the UL LBT succeeding in the at least one PRB allocation of determined PUCCH resource, determining to use the determined PUCCH resource for transmitting the UL control signal; and/or
- in response to the UL LBT failing:
  - determining a set of PUCCH resources from the plurality of PUCCH resources located within an active UL sub-band set of a channel occupancy time, and
  - determining a PUCCH resource for transmitting the UL control signal from the determined set of PUCCH resources by selecting a PUCCH resource with a resource identifier value closest to a resource identifier value of the determined PUCCH resource.

16. A computer program product comprising a non-transitory computer-readable storage medium bearing computer program code for determining a Physical Uplink Control Channel (PUCCH) resource for transmitting an uplink (UL) control signal embodied therein, which when executed by at least one processor of a device, causes the device to:
- receive at least one physical resource configuration for transmitting the UL control signal, the physical resource configuration comprising an indication of a plurality of PUCCH resources in a frequency domain;
- determine a PUCCH resource based on the received at least one physical resource configuration;
- adjust the determined PUCCH resource for transmitting the UL control signal in response to an UL listen before talk (LBT) failure prior to the transmission of the UL control signal, wherein the determined PUCCH resource for transmitting the UL control signal is adjusted based on an outcome of the UL LBT performed before the transmission of the UL control signal, and a time gap between the UL LBT and the transmission of the UL control signal is longer than a predefined threshold; and transmit the UL control signal using the adjusted PUCCH resource.

* * * * *

UNITED STATES PATENT AND TRADEMARK OFFICE
CERTIFICATE OF CORRECTION

| | | |
|---|---|---|
| PATENT NO. | : 12,232,118 B2 | Page 1 of 1 |
| APPLICATION NO. | : 17/266743 | |
| DATED | : February 18, 2025 | |
| INVENTOR(S) | : Kari Hooli et al. | |

It is certified that error appears in the above-identified patent and that said Letters Patent is hereby corrected as shown below:

On the Title Page

In Column 2, item (57), Abstract, Line 11, delete "of an" and insert -- of: an --, therefor.

In the Claims

In Column 26, Line 20, Claim 14, delete "(PRB" and insert -- (PRB) --, therefor.

Signed and Sealed this
Sixth Day of May, 2025

Coke Morgan Stewart
*Acting Director of the United States Patent and Trademark Office*